United States Patent
Auslander

(10) Patent No.: US 7,138,009 B2
(45) Date of Patent: Nov. 21, 2006

(54) SIGNATURE PROTECTED PHOTOSENSITIVE OPTICALLY VARIABLE INK COMPOSITIONS AND PROCESS

(75) Inventor: Judith D. Auslander, Westport, CT (US)

(73) Assignee: Pitney Bowes Inc., Stamford, CT (US)

( * ) Notice: Subject to any disclaimer, the term of this patent is extended or adjusted under 35 U.S.C. 154(b) by 79 days.

(21) Appl. No.: 10/873,321

(22) Filed: Jun. 22, 2004

(65) Prior Publication Data
US 2005/0279248 A1 Dec. 22, 2005

(51) Int. Cl.
C09D 11/02 (2006.01)
C09K 11/06 (2006.01)

(52) U.S. Cl. .................. 106/31.32; 106/31.64; 252/301.33; 252/301.36

(58) Field of Classification Search ............ 106/31.32, 106/31.64; 252/301.33, 301.36
See application file for complete search history.

(56) References Cited

U.S. PATENT DOCUMENTS

| | | | |
|---|---|---|---|
| 4,015,131 A | 3/1977 | McDonough et al. | |
| 4,705,567 A | 11/1987 | Hair et al. | |
| 5,084,205 A | 1/1992 | Auslander | |
| 5,114,478 A | 5/1992 | Auslander et al. | |
| 5,135,569 A | 8/1992 | Mathias | |
| 5,145,518 A | 9/1992 | Winnik et al. | |
| 5,231,135 A | 7/1993 | Machell et al. | |
| 5,294,664 A | 3/1994 | Morrison, Jr. et al. | |
| 5,310,887 A | 5/1994 | Moore et al. | |
| 5,331,097 A | 7/1994 | Gunnell et al. | |
| 5,397,674 A * | 3/1995 | Ozaki et al. ............ | 430/139 |
| 5,502,304 A | 3/1996 | Berson et al. | |
| 5,514,860 A | 5/1996 | Berson | |
| 5,525,798 A | 6/1996 | Berson et al. | |
| 5,554,842 A | 9/1996 | Connell et al. | |
| 5,569,317 A | 10/1996 | Sarada et al. | |
| 5,626,654 A | 5/1997 | Breton et al. | |
| 5,681,381 A | 10/1997 | Auslander et al. | |
| 5,766,324 A | 6/1998 | Ikegaya et al. | |
| 5,783,108 A * | 7/1998 | MacKay ............... | 252/301.36 |
| 5,877,235 A | 3/1999 | Sakuma et al. | |
| 5,932,139 A * | 8/1999 | Oshima et al. ........ | 252/301.16 |
| 6,039,257 A | 3/2000 | Berson et al. | |

(Continued)

FOREIGN PATENT DOCUMENTS

EP 0344379 9/1988

(Continued)

*Primary Examiner*—David Sample
*Assistant Examiner*—Veronica Faison-Gee
(74) *Attorney, Agent, or Firm*—Charles R. Malandra, Jr.; Angelo N. Chaclas

(57) ABSTRACT

Signature protected photosensitive optically variable (POV) inks are provided, which are capable of providing a unique signature in addition to other security features of POV inks. The inks contain at least two types of colorants, and a third, signature component and other ingredients to enable printing. A first colorant comprises a fluorescent dye and/or pigment emitting light within a characteristic emission band when excited by fluorescent-exciting radiation. A second colorant comprises a dye and/or pigment having a light absorption band at overlapping or longer wavelengths than the characteristic emission band of the first colorant in such a way as to result in a dark color. The third component is a fluorescent/phosphorescent rare earth composition. The inks give dark visible ink images, which also produce detectable coincident fluorescent and phosphorescent images. The inks can be used with detectors of red phosphorescence to achieve a new level of security in high speed sorting operations.

20 Claims, 21 Drawing Sheets

U.S. PATENT DOCUMENTS

| | | |
|---|---|---|
| 6,063,175 A | 5/2000 | Harris |
| 6,079,327 A | 6/2000 | Sarada |
| 6,083,310 A | 7/2000 | Peterson et al. |
| 6,142,380 A | 11/2000 | Sansone et al. |
| 6,143,807 A | 11/2000 | Lin et al. |
| 6,157,919 A | 12/2000 | Cordery et al. |
| 6,169,185 B1 | 1/2001 | Likavec et al. |
| 6,174,938 B1 | 1/2001 | Miller et al. |
| 6,176,908 B1 | 1/2001 | Bauer et al. |
| 6,494,943 B1 | 12/2002 | Yu et al. |
| 2002/0195586 A1 | 12/2002 | Auslander et al. |
| 2003/0005303 A1 | 1/2003 | Auslander et al. |
| 2003/0041774 A1 | 3/2003 | Auslander et al. |
| 2003/0085384 A1* | 5/2003 | Burnell-Jones ........ 252/301.36 |

FOREIGN PATENT DOCUMENTS

| | | |
|---|---|---|
| EP | 1024182 A1 | 8/2000 |
| EP | 1046687 A1 | 10/2000 |
| GB | 2240947 A | 8/1991 |

* cited by examiner

SIGNATURE PROTECTED PHOTOSENSITIVE OPTICALLY VARIABLE INK COMPOSITIONS AND PROCESS

BACKGROUND OF THE INVENTION

The invention relates to new photosensitive optically variable (POV) inks, and more particularly, to water soluble POV inks capable of printing images having enhanced functionality making them well adapted for use as security inks.

The POV inks of the invention are effective for use with inkjet printing and have a range of security applications. They can produce security markings of a type which set them apart from other inks. While POV inks present a significant challenge to counterfeiting when available from a secure source or licensed supplier, even the most sophisticated security measures can sometimes be circumvented. The invention provides inkjet inks having security features that are not easily detectable in the first instance and not readily reproduced once detected.

The inks of the invention are photosensitive optically variable, meaning that they can provide a printed visually black or dark gray machine-readable information-bearing marking that fluoresces in a specific wavelength range when excited with a shorter wavelength light. The printed images exhibit visual light absorption throughout the entire visual spectrum including the red region of the visible spectrum where red inks are invisible to typical automatic scanning systems. Inks of this type are described, for example by U.S. Patent Publication No. 2003/0041774, U.S. Patent Publication No. 2002/0195586, and commonly-assigned, copending U.S. patent application Ser. No. entitled, Photosensitive Optically Variable Ink Compositions Useful for Ink Jet Printing, filed on equal date with this application, in the names of J. D. Auslander and M. Chen. These inks will achieve acceptable PCS (Print Contrast Signal) on virtually all conventional substrates, including dark papers such as Kraft or Manila. The term PCS refers to the ratio of the Print Reflectance Difference (PRD) and the substrate reflectance, and the PRD is the difference between the paper reflectance and ink reflectance. These and other postal terms are given their meanings as defined by the United States Postal Service (USPS). These inks can be used with automated detectors of various types of information-bearing tickets, tags, labels, postage indicia and similar security markings.

There are many reasons for simply and effectively identifying the sender or originator of mail or other transported items, and there is a need for very high security to justify a high level of trust. In the case of mail, the use of Sender Identified Mail (SIM) markings is effective to help sort mail and can be used to verify rates and other information. Where security is important, the use of POV inks can provide a useful added layer of security. It would be desirable to have inks which appeared to be POV inks of the type described above, but which had an additional and not easily detectable security feature. Inks of this type could be of especial value where they are available from controlled sources and, especially, when used with a security method correlating formulation with authorized users. Such inks could enable a mail sorting facility to rapidly screen large volumes of mailpieces from trusted senders, thereby reducing or eliminating the need to specially handle every piece of mail for security screening.

The term "fluorescent security marking", as used herein, refers to a security marking that fluoresces in a defined region of the spectrum upon exposure to a shorter wavelength excitation light, such as UV light. The shift in wavelength between the incident excitation light and the fluorescent emission clearly distinguishes fluorescence from direct reflection. While the above POV inks can provide fluorescent security markings that are coincident with visible images, making them very difficult to detect and copy, especially where the inks are subject to controls restricting their availability, there is a need to address the challenge of making such inks even more difficult to counterfeit and capable of providing unique "fingerprints" suitable for forensic tracing. The invention adds an additional layer of security, making them phosphoresce—providing a lingering, detectable characterizing emission.

Automated detectors are known that are responsive to reflected visible light and fluorescent emissions from security markings resulting from excitation at a shorter wavelength, such as ultraviolet (UV) excitation. These inks can be used by detectors to verify that the fluorescence and the indicium image are physically coincident. They are also capable of inkjet printing for the provision of easily variable information. They form a very small class adapted for fluorescent security marking that can be implemented with high speed on a wide variety of substrates to provide easily variable security markings capable of high speed verification. Detectors currently in use in high speed facer/canceller machines can read FIM's and detect red fluorescence in postage marks and green phosphorescence in stamps. There is currently no assigned function for red phosphorescence and there are no security POV inks possessing such a characteristic.

There is a need for additional POV inks that provide effective security, with unique compositions to yet further enhance the provision of security systems having customizable and traceable properties.

SUMMARY OF THE INVENTION

It is an object of invention to provide new photosensitive optically variable inks.

It is an object of the invention to provide new inks having a combination of visible, fluorescent and phosphorescent properties.

It is another object of the invention to provide a new POV inks effective for security marking and security methods employing them.

It is another object of invention to provide security inks having unique optical and physical properties to enhance their use in providing unique fingerprints that can be identified and traced forensically employing a combination of visible, fluorescent and phosphorescent properties.

It is another object of invention to provide POV security inks exhibiting red phosphorescence.

It is another object of the invention to provide security inks capable of printing images that cannot be copied without a foreknowledge of their characteristics, which are detectable only with specialized equipment.

It is yet another object of invention to provide POV security inks having unique optical and chemical properties to enhance the reliability of automated sorting equipment.

It is yet another object of invention to provide POV security inks having such a specific signature to be effective at very low concentrations, e.g., less than 6% and preferably less than 1%, so as to provide a fingerprint unique to the ink.

It is yet another object of invention to provide POV security inks having exhibiting a sharp fluorescent spike as a signature feature along with a broader fluorescent peak or plurality of peaks to form a complex and secure signature.

It is another object of invention to provide a new type of POV ink, which can be printed with inkjet printing as a means for creating secure sender identified mail.

It is yet another object of the invention to provide POV inks adapted to enable a mail sorting facility to rapidly screen large volumes of mailpieces from trusted senders, thereby reducing or eliminating the need to specially handle every piece of mail for security screening.

It is another object of invention to provide a new type of POV ink, having a unique combination of properties in visible light and another UV excitation generating fluorescence and phosphoresce to enhance their use in providing unique fingerprints that could be identified and traced forensically, which can be printed on a wide variety of paper textures and colors by inkjet printing to provide easily variable information within the marking.

These and other objects are accomplished by the invention, which provides ink compositions, processes for using them and the resulting products.

The inks of the invention are aqueous and capable of producing dark, machine-readable markings exhibiting fluorescence when exposed to fluorescent-exciting radiation, and are also detectably phosphorescent, preferably in the red range, and are of suitable viscosity and surface tension for use in ink jet printing. They comprise: (a) a first colorant comprising a fluorescent dye and/or pigment emitting light within a characteristic emission band when excited by fluorescent-exciting radiation; (b) a second colorant comprising a dye and/or colloidal pigment having a light absorption band overlapping with or at longer wavelengths than the characteristic emission band of the first colorant, in such a way as to result in a dark color, (c) a fluorescent/phosphorescent composition in a detectable amount effective for security identification, and (d) an aqueous liquid vehicle comprising water and a water-soluble vehicle in sufficient amounts to achieve an ink viscosity and surface tension effective for application of the ink to a substrate in a predetermined pattern by ink jet printing. The phosphorescent compositions of choice will be rare earth compositions comprising one or more species of rare earth components.

The process of the invention comprises: printing an image having visible, fluorescent and phosphorescent components by providing an inkjet printer with an ink as described, and printing an image with the ink on a suitable substrate.

In another process aspect, the invention provides a security method, comprising: (a) printing an image with the ink as defined above; (b) illuminating the image with white light; (c) reading the image as illuminated with white light; (d) illuminating the image with ultraviolet light; (e) reading the image with a red fluorescence detector; (f) comparing the image read with the red fluorescence detector to a reference value; (g) generating a control signal based on the comparison of step (f); (h) terminating ultraviolet illumination; (i) reading the image with a red phosphorescence detector; (j) comparing the image read with the red phosphorescence detector to a reference value; and (k) generating a control signal based on the comparison of step (j).

The inks of the invention and the processes for using them, as well as the resulting products, have a number of preferred aspects, including: wherein the ink comprises two rare earth species having characteristic, different emission spectra; wherein the ink exhibits an emission band width of less than about 100 nm, e.g., from about 70 to 80 nm, for a primary peak and a secondary peak of less than about 10 nm; wherein the ink comprises a rare earth composition showing a phosphorescence spike on the right side of a primary fluorescence peak and a secondary emission peak; wherein the ink comprises a rare earth composition showing detectable phosphorescence when present at a concentration of less than 5% of the weight of the ink; and yet others of which are described below and illustrated in the examples and the accompanying drawings.

BRIEF DESCRIPTION OF THE DRAWINGS

The invention will be better understood and its advantages will become more apparent from the following description, especially when read in light of the accompanying drawing, wherein.

DETAILED DESCRIPTION OF THE INVENTION

Figure 1:
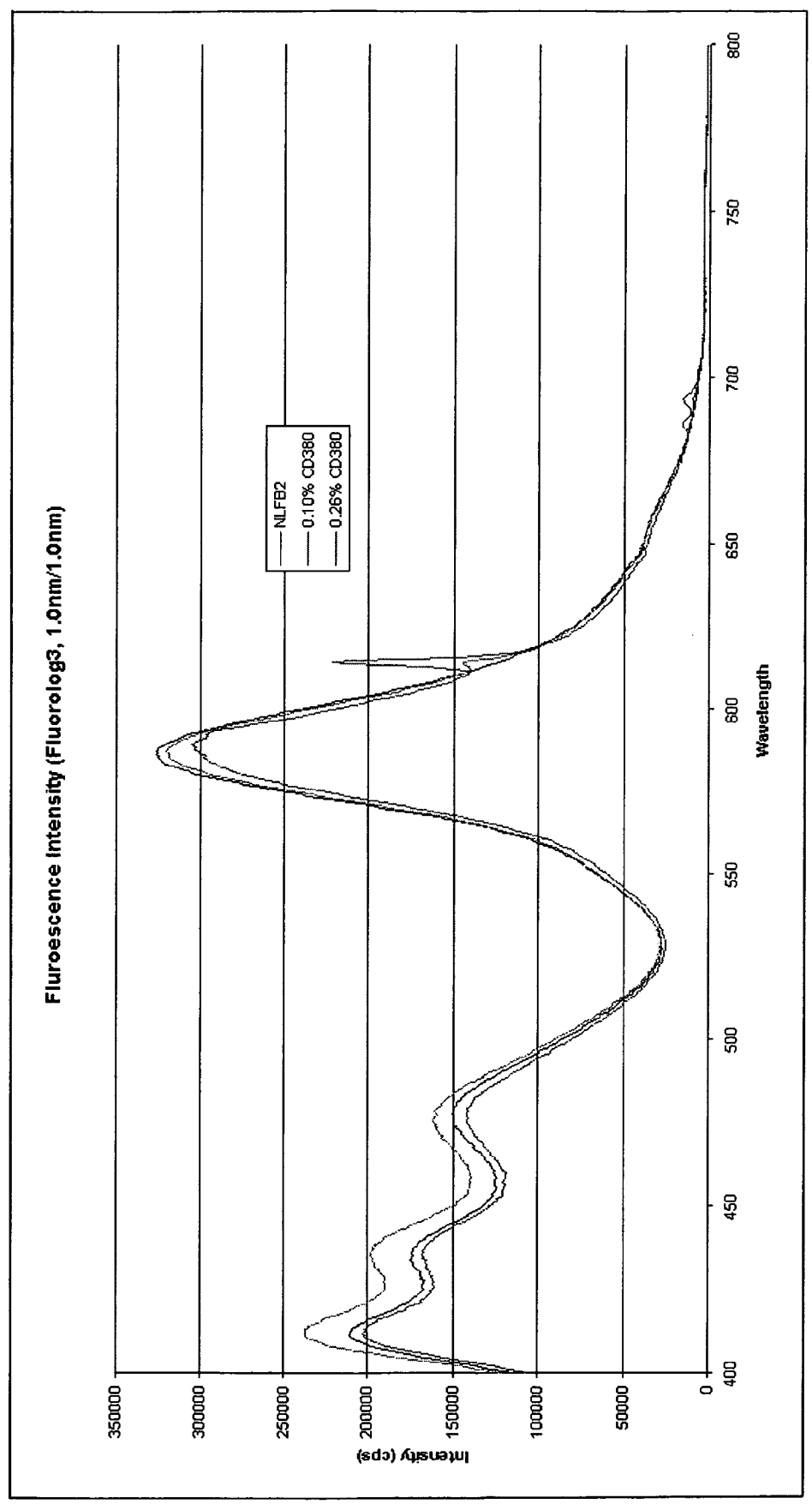
FIG. 1 is a graph showing fluorescence emission intensity for an ink of the invention similar to that described in Example 1 but containing a low level of a rare earth composition, which shows an emission band width of less than about 100 nm, e.g., from about 70 to 80 nm, for a primary peak and a secondary peak of less than about 10 nm.

The invention relates to new photosensitive optically variable (POV) inks capable of printing images by various printing means, including inkjet printing. The term "photosensitive optically variable" means that the inks can provide a printed visually black or dark gray machine-readable information-bearing marking that fluoresces in a specific wavelength range when excited with a shorter wavelength light. The printed images exhibit visual light absorption throughout the entire visual spectrum including the red region of the visible spectrum where red inks are invisible to typical automatic scanning systems. Inks of this type are described, for example by U.S. Patent Publication No. 2003/0041774, U.S. Patent Publication No. 2002/0195586, and commonly-assigned, copending U.S. patent application Ser. No. entitled, Photosensitive Optically Variable Ink Compositions Useful for Ink Jet Printing, filed on equal date with this application, in the name of Judith D. Auslander. As with the inks described therein, the inks of the invention can produce images that can be viewed with both visible and ultraviolet light to have physically coincident positive and negative images. The inks of the invention, however, provide additional functionality, having a unique combination of visible, fluorescent and phosphorescent properties. It is an advantage of the inks of the invention that security marks can be printed that cannot be copied without a foreknowledge of the ink characteristics, which are detectable only with the specifically designed equipment.

The inks of this invention can be utilized in a number of ink jet printing operations, giving visible dark and fluorescent images. The inks of the invention provide both visible and fluorescent images enabled by printing the inks of the invention on a substrate, one of a printed substrate in reflection under illumination by visible light and one of the same printed substrate fluorescing under ultraviolet excitation. The inks of the invention add to this the ability to provide yet a third coincident image, a phosphorescent one. Such a combination of detectable images is unique and highly advantageous for a number of utilities, some of which are described herein. In one preferred aspect, the inks can comprise two rare earth species having characteristic, different emission spectra. In another preferred aspect, the inks exhibit an emission band width of from about 70 to 80 nm for a primary peak and a secondary peak of less than about 10 nm. In another, the inks can comprise a rare earth specie showing a phosphorescence spike on the right side of a primary fluorescence peak and a secondary emission peak. In another the ink can comprise a rare earth specie showing detectable phosphorescence when present at a concentration of less than 5% of the weight of the ink. The phosphorescent compositions of choice will be rare earth compositions comprising one or more species of rare earth components. Other preferred aspects are described below and illustrated in the examples and the accompanying drawings.

An application of a POV security marking in the field of postage evidencing is a black postage indicium that fluoresces in the red region of the spectrum when illuminated with ultraviolet light and then phosphoresces upon termination of the illumination. For example, a POV security marking can provide a DataMatrix bar code wherein the image scanned in reflection and obtained by illuminating the marking with visible light provides dark areas corresponding to printed areas of the security marking, and the image scanned in fluorescence under ultraviolet (UV) illumination results in light areas in the scanned image corresponding to the printed areas. The fluorescing image is a negative of the reflective image, i.e., there is a strong negative correlation between the two images. To these readily viewable images, the invention adds another series of features by providing a distinct, narrow band of fluorescent emission which has a narrower bandwidth and a peak at a different wavelength than the main fluorescing image of the basic black fluorescent ink and also exhibits phosphorescence, both of these added features at low concentration of rare earth metal composition.

Forensic characteristics are important to value metering applications such as postal payment and other security-dependent applications, including various documents identifying the sender. The ability to simply and effectively identify the sender or originator of mail or other transported items can be valuable in a number of contexts. In the case of mail, the use of Sender Identified Mail (SIM) markings is effective to help sorting and can be used to verify rates and other information. The inks of the invention can provide a useful added level of security in, the presence of which is not easily discernable to a counterfeiter. Inks of this type have the special advantage that they can be made available through controlled sources. Even higher levels of security can be obtained when they are used with a security method correlating formulation with authorized users. The inks of the invention can enable a mail sorting facility to rapidly screen large volumes of mailpieces and rapidly separate those from trusted senders, thereby reducing or eliminating the need to specially handle every piece of mail for security screening. This can provide cost savings without diminishing security.

As with the POV inks described above, the invention can make use of automated detectors in addition to those commonly used that are responsive to reflected visible light and fluorescent emissions from security markings resulting from excitation at a shorter wavelength, such as ultraviolet (UV) excitation. The inks of the invention can thus be used to verify that the fluorescence and the visible image are physically coincident. And, they are also capable of inkjet printing for the provision of easily variable information. They form a very small class adapted for fluorescent security marking that can be implemented with high speed on a wide variety of substrates to provide easily variable security markings capable of high speed verification. The invention makes their use even more secure when employed in a system comprising red phosphorescent detectors and control logic correlating a detected combination of fluorescent and phosphorescent images to printed user identification information in a format suitable for machine reading.

Detectors currently in use in high speed facer/canceller machines can read FIM's, and detect red fluorescence and green phosphorescence in stamps. There is currently no assigned function for red phosphorescence and there are no security POV inks possessing such a characteristic. The inks of the invention can be used with detectors of red phosphorescence to achieve a new level of security in high speed sorting operations. Trusted sender origin mail and other objects can be reliably identified and mechanically sorted.

The ink compositions of the invention employ a first colorant comprising fluorescent pigment or dye mixtures (soluble and/or embedded dyes) and a second colorant having overlapping or longer wave length absorbing colorants (dyes and/or pigments), in combination with a fluorescent/phosphorescent component, e.g., a metalo-organic composition, in particular one or more rare earth complexes, such as complexes of europium and terbium. The combination gives a dark, preferably black or grey visible ink image, which also produces detectable coincident fluorescent and phosphorescent images.

Among the fluorescent/phosphorescent composition species useful in the inks of the invention are those which include a metal having phosphorescent properties, especially of the rare earth group, namely, the metals of the Lanthanide series, including lanthanum, cerium, praseodymium, neodymium, promethium, samarium, europium, gadolinium, terbium, dysprosium, holmium, erbium, thulium, ytterbium, lutetium, and the Actinide series including, actinium, thorium, protactinium, uranium, neptunium, plutonium, americium, curium, berkelium, californium, einsteinium, fermium, mendelevium, nobelium and lawrencium. In particular, the phosphorescent composition will preferably comprise a metalo-organic phosphorescent component, in particular one or more rare earth complexes, such as complexes of europium and terbium. These compositions typically contain an organic ligand having the role of a rare earth trivalent ion, thus giving an energy transfer complex from the trivalent ion to the organic ligand and thus obtaining an efficient transition from the ground state to the excited state and back again to the ground state to effect a strong fluorescent signal. These compositions can contain nonphosphorescent metal components as well as phosphorescent metal components, especially as activators. It is an advantage of the invention that these materials can be used at weight ratios effective to distinguish the forensic signature provided by the composition, say in the range of from 1:100 to about 100:1. Typical concentrations will be within the range of from about 0.1 to 10%, and preferably within the range of from 2 to 6%.

In the case of fluorescent/phosphorescent materials, measurement of decay characteristics may also be observed and compared to reference values to obtain a control signal indicating either failure or acceptance of identification. Mixtures of phosphors and fluorophors can be employed in combination and observed for their respective responses to irradiation for comparison to reference values and the generation of a control signal. The materials of particular interest are inorganic in nature and comprise crystal lattices in which rare earth ions are present as sensitizers and activators. The excitation and emission characteristics of these materials are inherent characteristics of the rare earth ions employed. Their corresponding optical absorption and emission processes can be attributed to electron transitions within an incompletely filled 4 f shell of the respective rare earth ions. Advantageously, rare-earth ions have narrow band optical absorption and emission spectra, which are to a great extent independent of the nature of the crystal lattice. The sharp, discrete bands and the low interaction with the crystal lattice usually result in a high saturation of the luminescence color and a high luminescence quantum yield.

Thus, the inks of the invention are photosensitive optically variable (POV) inks that produce visible, dark prints that fluoresce when excited with a shorter wavelength light such as ultraviolet light and phosphoresce within a characteristic narrow band and with a characteristic decay rate when such illumination is terminated. Preferably, the ink comprises two rare earth species having characteristic, different emission spectra; wherein the ink exhibits an emission band width of from about 70 to 80 nm for a primary peak and a secondary peak of less than about 10 nm. Desirably, the ink comprises a rare earth specie showing a phosphorescence spike on the right side of a primary fluorescence peak and a secondary emission peak. Preferred phosphorescent compositions will comprise a rare earth specie, that are capable of showing detectable phosphorescence when present at a concentration of less than 5% of the weight of the ink. Among the preferred phosphorescent inks are those based on europium or complexes comprising it as are exemplified by commercial materials available as Lumilux CD 380 and Lumilux CD E-9574, the first of which is typically employed at concentrations of up to about 5%, e.g. from about 0.5 to 3%, and the second is employed at higher concentrations, typically up to about 12%, e.g. from 1 to 5%. Preferred compositions employ both compositions together as will be exemplified below in Example 4.

The inks of the invention will comprise at least two distinct colorant portions to achieve the objectives of coincident visible, fluorescent and phosphorescent images with characteristic properties. A first colorant potion will comprise a fluorescent pigment and/or dye emitting light within a characteristic emission band when excited by fluorescent-exciting radiation. Red fluorescence is preferred. The fluorescent dye will be present in the formulation in concentration effective to provide both a necessary contribution to the visible color of the ink and to provide a machine detectable fluorescent image. Among the suitable fluorescent dyes for the first colorant are those dyes meeting the objectives herein described in U.S. Patent Publication No. 2002/0195586 as well as those of U.S. Patent Publication No. 2003/0041774 and the aforementioned copending U.S. patent application Ser. No. entitled, Photosensitive Optically Variable Ink Compositions Useful for Ink Jet Printing, filed on equal date with this application, in the name of Judith D. Auslander. Thus, the invention can utilize water soluble as well as polymer embedded fluorescent dyes. The noted publications list representative compositions and illustrate and describe concentrations for use. The disclosure of this technical detail is hereby incorporated by reference.

Among preferred water soluble fluorescent dyes are those characterized by red fluorescence and a suitably intense visible color to provide a dark color to the ink in the ink composition. The most preferred of this class have visible colors ranging from red to green and are fluoresce by emitting light within the range of from 500 to 680 nm. Preferred yellow or orange fluorescent dye components (FY) may be based on the chromophoric systems such as anionic coumarins, cationic coumarins, anionic naphthalimide dyes, pyranine (anionic pyrene dye), neutral, anionic and cationic perylene dyes, and anionic xanthene dyes. Some preferred yellow or orange fluorescent dyes are anionic coumarines, cationic coumarines, courmarine sulfonic acid, anionic napthalimide, neutral perylene, cationic perylene, anionic pyronine, and anionic napthalimide dyes, as illustrated for example in FIG. 13 of U.S. Patent Publication No. 2002/0195586. Among the useful red and purple fluorescent dyes are anionic xanthene dyes, bispyrromethane boron complexes, cationic and zwitterionic pyronines and sulphorhodamine B (SRB), as illustrated for example in FIG. 14 of U.S. Patent Publication No. 2002/0195586. Acid Red 52 is a suitable water-soluble magenta dye. Acid Red 52 dye has satisfactory solubility in water but a very low water fastness as normally employed. Thus, a disadvantage of the magenta Acid Red 52 dye is that the ink containing such dye bleeds when exposed to water. Also among the useful yellow and orange dyes are acid yellow 7, coumarin sulfonic acid, cationic coumarins, anionic coumarins, neutral, anionic and cationic perylene dyes, anionic naphthalimide dyes and pyranine dyes. An important feature of these dyes is their ability to form a dark colored ink with good fluorescent properties. These and the other ones identified in U.S. Patent Publication No. 2003/0041774, can be employed as effective.

In order to achieve a black ink, the colorant mixture of the invention must absorb across the entire visible spectrum, from 390 nm to ca. 1200 nm. To obtain simultaneous red fluorescence in ultraviolet light in the desired region of 580–630 nm, the composition must absorb fluorescence exciting radiation, e.g., UV light, efficiently and fluoresce efficiently, preferably between 580 and 630 nm. The first colorant dye (or dyes) is selected to meet these criteria in combination with the second colorant of the invention which comprises a colloidal pigment alone or with a dye having a light absorption band at longer wavelengths than the characteristic emission band of the first colorant or also overlapping the emission wavelength of the first colorant in such a way as to result in a dark color, preferably black.

The second colorant will be present in the formulation in concentration effective to provide a necessary contribution to the visible color of the ink without preventing machine detectable fluorescent image. The second colorant can be any of the dyes and/or pigments described in the aforementioned U.S. Patent Publication No. 2003/0041774, U.S. Patent Publication No. 2002/0195586, and commonly-assigned, copending U.S. patent application Ser. No. entitled, Photosensitive Optically Variable Ink Compositions Useful for Ink Jet Printing, filed on equal date with this application, in the names of Judith D. Auslander and Michael Chen. The inks of the invention typically employ the second colorant at concentrations (based on the weight of dry solids) of from about 1 to about 5%, more narrowly, from 2 to 4%, by weight of this second colorant in the ink composition as applied. The dyes and/or pigments will have characteristic penetrations into paper and preferred members of the group will not significantly lose definition due to water wetting after printing by inkjet printing.

Among the colorants suitable for use in the second colorant of the inks of the invention the water dispersible colloidal pigments, as described, for example, in U.S. Pat. No. 6,494,943 to Yu, et al. The pigments described broadly by the Yu, et al. patent are identified as colored pigments having one or more desired parameters and/or properties are described. These parameters and/or properties include: a) a particles size of from about 10 nm to about 300 nm; b) an accusizer number of less than $10^{10}$ particles/ml of dispersion at 15% solids which are greater than 0.5 micron; c) a filterability such that when in a liquid medium, 100 ml having 10% solids of the colored pigment filters through a 3 micron nylon absolute filter; d) a colored pigment purity of greater than about 80%, based on extractable material; and/or e) a stability such that the above-described properties do not change by more than 50% at 25° C. for at least one week. Similarly, the preferred pigments of the invention can be characterized as having one or more of these properties. In addition to these pigments are those that require dispersants to remain stable. One preferred colloidal pigment is available from Cabot Corporation as Cabot Blue Pigment Dispersion, Cyan COJ 250. Pigments of this type will not bleed to the extent of dyes, yet in the formulations of the invention will provide a penetration and water fastness highly desirable for security and other value metered markings. In addition to these pigments, carbon black of suitable characteristics can be employed in minor amount or in combination with other dark pigments. In the instances where carbon black will be the sole dark pigment or colorant, it will tend to quench the fluorescence to an extent, but this may be advantageous in some circumstances where the phosphorescence is not also quenched. When employed, the carbon black will typically comprise less than about 5%, e.g., about 1 to 3%, of the ink.

The second colorant will also preferably include one or more appropriately colored water soluble dyes as described, for example, in U.S. Patent Publication No. 2003/0041774. Among these are blue dyes, such as acid and direct dyes purified for ink jet use such as CI Acid Blue 9, Duasyn Blue FRL-SF (Direct Blue 199), Projetfast Cyan 2, Direct Blue 307 or any blue dye with an extinction coefficient higher than 10,000 soluble in water. The dye can also be one of the dyes mentioned above, selected to provide a desired color, shade or hue in the visible range, while providing suitable darkness in the printed ink to maintain readability and suitable fluorescence to provide machine readability.

In addition to the described colorants and equivalents, the ink compositions of the invention will contain an aqueous liquid vehicle comprising water and a water-soluble vehicle in sufficient amounts to achieve an ink viscosity and surface tension effective for application of the ink to a substrate in a predetermined pattern by ink jet printing. Typical of these components are those described in the above noted patent publications, which are hereby incorporated by reference. The ink carrier for the colorants used in these ink compositions contains at least 65% water.

Fluorescence stabilizers can be employed in concentrations effective for maintaining (sometimes by enhancing fluorescence) the constant fluorescence level. Since the fluorescence of low viscosity inks can decrease as the ink penetrates the paper, it is preferred to include an additive effective to help maintain a constant level of fluorescence. The following solvents can provide enhancement of fluorescence: N,N-Dimethylacetamide, sulfolane, formamide, methylphenyl sulfoxide, N-Methylpyrrolidinone, 4-Methylmorpholine-N-oxide (MMNO), dimethylsulfoxide (DMSO), and the like. All of these solvents have the characteristic of a dipolar aprotic solvent with a high dielectric constant (>ca. 20) or high value of Hildebrand solubility parameter ($\delta$>10 $MPa^{1/2}$).

From this list, the 4 methylmorpholine-N-oxide (MMNO) had the best ability to achieve long term increased fluorescence, has no fluorescence quenching tendency and is a hygroscopic high boiling solid when pure. (It is typically supplied as 50–60% aqueous solution.) The MMNO is a known solvent for cellulose and aids penetration into the fibers of the paper, which may increase the fluorescence in a selective and long lasting manner. Polar low molecular weight resins (PLMWR) are of benefit to enhance and stabilize the fluorescence, in many cases to a lesser extent and by a different mechanism that the FS materials described above. Polar resins such as polyvinylpyrrolidone (MW 15000) and polyethyleneglycols are beneficial. Other water-soluble resins with good solvent characteristics for polar dyes are: polyvinylalcohol, poly N,N-dimethylhydantoin, polyacrylates, etc.

Glycol ethers, such as BTG (Triethylene Glycol Mono Butyl Ether), can have multiple beneficial effects such as: bridging between the water and other organic solvents, enhancing the color and fluorescence by internal hydrogen bonding, and improved penetration into the paper. The most efficient glycol was the BTG. Among suitable glycols that could be used are as following: triethylene glycol n-Butyl Ether (BTG), tripropylene glycol methyl ether (TPM), diethylene glycol n-butyl ether (DB), diethylene glycol methyl ether (DM), dipropylene glycol methyl ether (DPM), and the like.

Amines such as triethanol amine, ethanol amine, diethanolamine, trisopropanolamine, butyldiethanolamine, N,N dimethylethanolamine, N,N diethylethanolamine, N,N dipropylethanolamine, and the like can be useful in preventing the aggregation of the dyes, the evaporation during drying as a fugitive counterion and thus providing improved waterfastness as well as for improved solubility in water/glycol/ether mixtures. The amine helps also in maintaining constant viscosity during long periods of rest as well as fluidity and easy redispersibility. In addition, the amine does not cause clogging of nozzles during printing or at the time of restarting after interruption of printing, thus maintaining high ejection stability.

The ink compositions of the invention are illustrated below in preferred forms and are, in these forms and others, highly effective for ink jet imprinting visible and fluorescent images, both preferably being machine readable. The images will also have a detectable, preferably readable, phosphorescent image, preferably a machine readable red phosphorescent image. The visible images are clear to normal human sight and effective for use with various image-reading machines operable for light in the visual range. The images are also sufficiently fluorescent, despite quenching due to the presence of colored dyes or pigments, to provide machine-readable fluorescent images which are substantial negatives of the visible images. Desirably, within the spectral range of interest (SROI), e.g., from 390 to 680 nm (visible range), the ink reflectance is less than 50% of the paper reflectance.

The inks of the invention are capable of imagewise application by ink jet printing and of providing machine-readable images when exposed to visible and fluorescent-exciting radiation. For an ink to be effectively used by ink jet printing, it must have a suitably low viscosity, yet have sufficient solids for it to achieve sufficient fluorescence and visible light reflectance to provide discernable images when dried. Preferably, the dry inks will provide machine-readable images on a wide variety of substrates.

The inks will contain an aqueous liquid vehicle comprising water and a water-soluble vehicle in sufficient amounts to achieve an ink viscosity and surface tension effective for application of the ink to a substrate in a predetermined pattern by ink jet printing. Viscosities will typically be less than about 15 cps. For thermal ink jet printing, the viscosity should be within the range of from 1 to 5 cps when measured Haake Viscotester at 25° C., preferably from 2 to 4 cps, and exhibit a surface tension of from 20 to about 80 dyne/cm when measured by Fisher Surface Tensiomat at 25° C., preferably from 30 to 50 dyne/cm. For ink jet printing by piezoelectric means, the viscosity should be within the range of from 1.5 to 15 cps when measured by the above method, preferably from 2 to 12 cps.

The preferred inks of the invention will have a visual dark color (neutral black), a red-fluorescent signal and a red phosphorescent signal, when excited with UV light short or long wavelength. The print contrast signal PCS (also, PCR) is preferably greater than 0.35, for white and kraft papers with the red or green filters, when measured with the Envelope Reflectance Meter from the USPS. For white paper with red filter, values of greater than 0.45 are desired, e.g., 0.48 and above, e.g., 0.48–0.6, and essentially the same values with a green filter. For kraft paper, it is preferably greater than 0.35, e.g., 0.37–0.5 for a green filter and 0.45 and above, e.g., 0.43–0.6, with a red filter. The test methodology for this and other data referred to herein is described, for example, in U.S. Patent Publication No. 2003/0041774.

Figure 18:
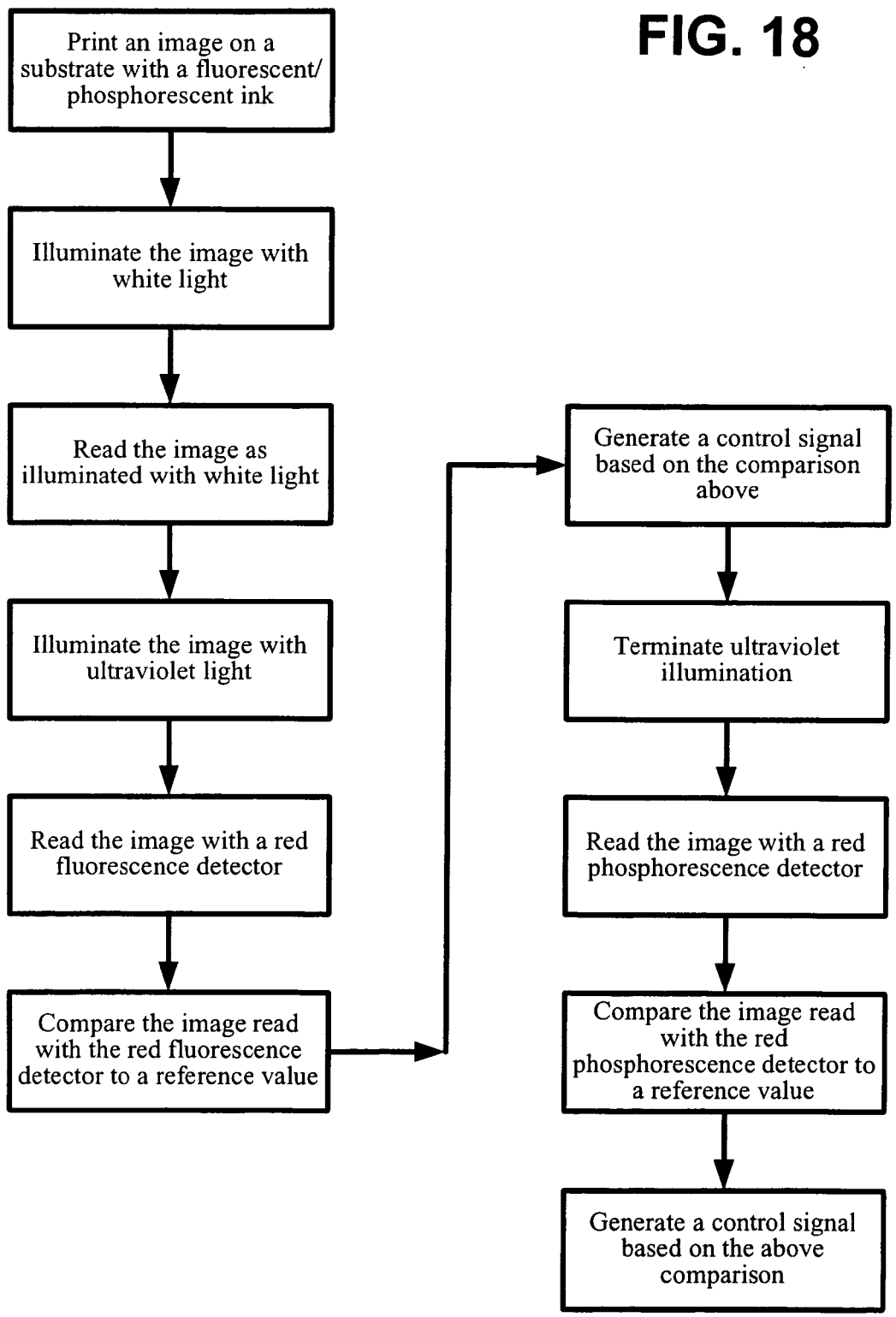
FIG. 18 is a process flow diagram, which illustrates one preferred process sequence according to the invention.

The PRD is preferably greater than 0.25 for white and kraft paper with the red and green filters. For white paper with a red filter, it can be 0.60 and above and 0.55 and above for a green filter. For kraft paper with a red filter, it can be 0.30 and above and 0.25 and above for a green filter. The optical density of the visible component is therefore high enough to allow automatic scanning using an OCR scanner or the like. The fluorescent component is suitable for use by the facing equipment to orient the mail and, preferably, to discriminate from green phosphorescent stamps. The emissions are in the wavelength range of 580–640 nm when excited by UV light. The fluorescent intensity should be at least 7 PMU and for examples is in the range of (39–69) Phosphor Meter Unit (PMU) for solid printed areas and 50 to 98 PMU for drawdowns, the fluorescent component can be carried by the solvent (carrier) into the substrate and provide adequate fluorescent signal intensity. In another process aspect, the invention provides a security method, such as is illustrated in FIG. 18, which shows a process flow diagram illustrating one preferred process sequence according to the invention. In general the process will comprise: (a) printing an image with the ink as defined above; (b) illuminating the image with white light; (c) reading the image as illuminated with white light; (d) illuminating the image with ultraviolet light; (e) reading the image with a red fluorescence detector; (f) comparing the image read with the red fluorescence detector to a reference value; (g) generating a control signal based on the comparison of step (f); (h) terminating ultraviolet illumination; (i) reading the image with a red phosphorescence detector; (j) comparing the image read with the red phosphorescence detector to a reference value; and (k) generating a control signal based on the comparison of step (j).

The following examples are presented to further illustrate and explain the invention and are not to be taken as limiting in any regard. Unless otherwise indicated, all parts and percentages are by weight.

EXAMPLE 1

An ink according to the invention is prepared according to the invention including as an additional security component in the form of a pigment exhibiting two fluorescent bands (one, a broad emission band characteristic of fluorescent colorants in black fluorescent ink and a second distinct, narrow fluorescent emission band due to the presence of a rare earth metal composition, Europium in Lumilux CD380) and phosphorescence due to the rare earth metal composition. This ink is compared to a black fluorescent ink not containing the additional security component.

| Components | Wt (%) Comparison | Wt (%) Invention |
|---|---|---|
| Distilled Water | 38.04 | 37.76 |
| Glycerol | 1.69 | 1.68 |
| Ethylene Glycol | 3.38 | 3.35 |
| Triethylene Glycol Mono Butyl Ether (BTG) | 3.28 | 3.26 |
| Lumikol Red Dispersion | 26.42 | 26.22 |
| Lumikol Orange Dispersion | 22.64 | 22.47 |
| Acryjet Cyan 157 Dispersion | 4.55 | 4.52 |
| Lumilux CD 380, rare earth (Europium) composition | 0 | 0.74 |
| Total | 100.0 | 100.00 |

-continued

| Components | Wt (%) Comparison | Wt (%) Invention |
|---|---|---|
| Properties of Drawdown and Inks | | |
| PMU, Fluorescence (drawdown) | 85 | 99 |
| PMU, Phosphorescence (drawdown) | 0 | 89 |
| OD (drawdown) | 0.59 | 0.80 |
| pH | — | — |
| Viscosity (cp) | 3.55 | — |
| Surface Tension (Dyne/cm) | — | — |

Figure 2:
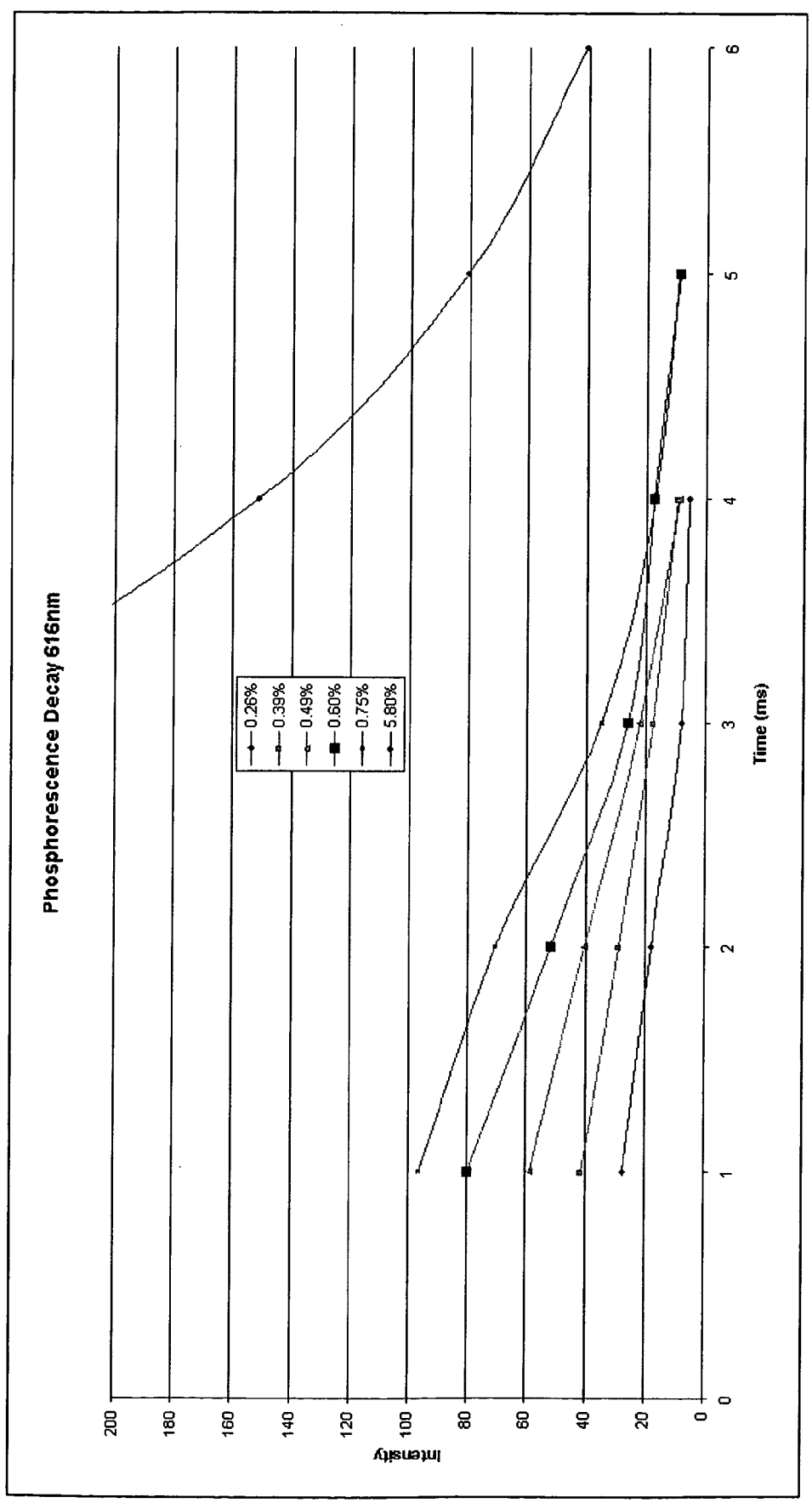
FIG. 2 is a graph showing phosphorescence decay for an ink of Example 1.

The effect of adding the rare earth metal composition to the black fluorescent ink provides a striking security effect due to: (1) the narrow emission band of the rare earth metal composition which partially overlays the emission spectrum for the comparison dye, and (2) a phosphorescence having a characteristic decay. FIG. 1 shows fluorescence emission intensity is provided here to illustrate an advantage and preferred aspect of the invention, showing an emission band width of less than about 100 nm, e.g., from about 70 to 80 nm, for a primary peak and a secondary peak of less than about 10 nm. In the case of FIG. 1, low concentrations (0.10 and 0.26%) of the rare earth composition are used in an ink also containing carbon black (see Example 7 below) to provide a unique, hard to detect signature feature. FIG. 2 is a graph showing fluorescence emission decay for inks with varying concentrations of rare earth compositions. The exact nature of the security ink having these characteristics is difficult to detect in the first instance using conventional reading equipment comprising only specified visible and fluorescent capabilities.

EXAMPLE 2

A series of inks according to the table below is prepared, varying the concentration of the rare earth specie from 0 to 3% to help illustrate the nature of the difference between the inks of the invention and those capable of providing only visible and fluorescent images.

| Components | Wt (%) Comparison | Wt (%) Invention |
|---|---|---|
| Distilled Water | 72.09 | 69.93 |
| Triethanolamine (TEA) | 0.31 | 0.30 |
| 4 methylmorpholine-N-oxide (MMNO) | 1.92 | 1.86 |
| 5,5-Dimethyl hydantoin formaldehyde | 5.06 | 4.90 |
| Triethylene Glycol Mono Butyl Ether (BTG) | 2.61 | 2.53 |
| Dodecylbenzene sulfonic acid (DBSA) | 0.40 | 0.39 |
| Glycerol | 8.6 | 8.3 |
| 1,2,4-butanetriol | 4.0 | 3.9 |
| Acid Yellow 184 | 0.65 | 0.63 |
| Acid Red 52 (Pylam, 400%) | 0.80 | 0.77 |
| Pyranine 120 (Bayer) | 2.06 | 2.00 |
| Millijet Blue 28(dye) | 1.46 | 1.41 |
| Lumilux CD380, rare earth (Europium) composition | 0.00 | 3.01 |
| Total | 100.0 | 100.0 |
| Properties of Drawdown and Inks | | |
| PMU, Fluorescence (drawdown) | 35 | 49 |
| PMU, Phosphorescence (drawdown) | 0 | 93 |
| OD (drawdown) | 0.83 | 0.80 |
| pH | 7.62 | 7.46 |
| Viscosity (cp) | 2.42 | 2.59 |
| Surface Tension (Dyne/cm) | 35.1 | 34.6 |

| CD380 | Fluorescence | | | | |
|---|---|---|---|---|---|
| | Intensity (excitation: 254 nm) | | | Intensity (excitation: 365 nm) | |
| Wt (%) | @592 nm | 615 nm | 684 nm | 593 nm | 733 nm |
| 0 | 108095 | 77485 | N/A | 798459 | 3300000 |
| 1 | 135345 | 179455 | 52107 | 940359 | 3000000 |
| 2 | 145993 | 300117 | 78465 | 891335 | 2900000 |
| 3 | 164027 | 420197 | 97125 | 837248 | 2600000 |

Note:
Intensity was measured by Fluorolog-3.

| EFFECT OF LUMILUX CD380 ON FLUORESCENCE AND PHOSPHORESCENCE FOR HOMOGENOUS BF INK | | |
|---|---|---|
| LUMILUX CD380 wt (%) | PMU (Fluorescence) | PMU (Phosphorescence) |
| 0 | 35 | 0 |
| 1 | 41 | 32 |
| 2 | 44 | 64 |
| 3 | 49 | 93 |

Figure 3:
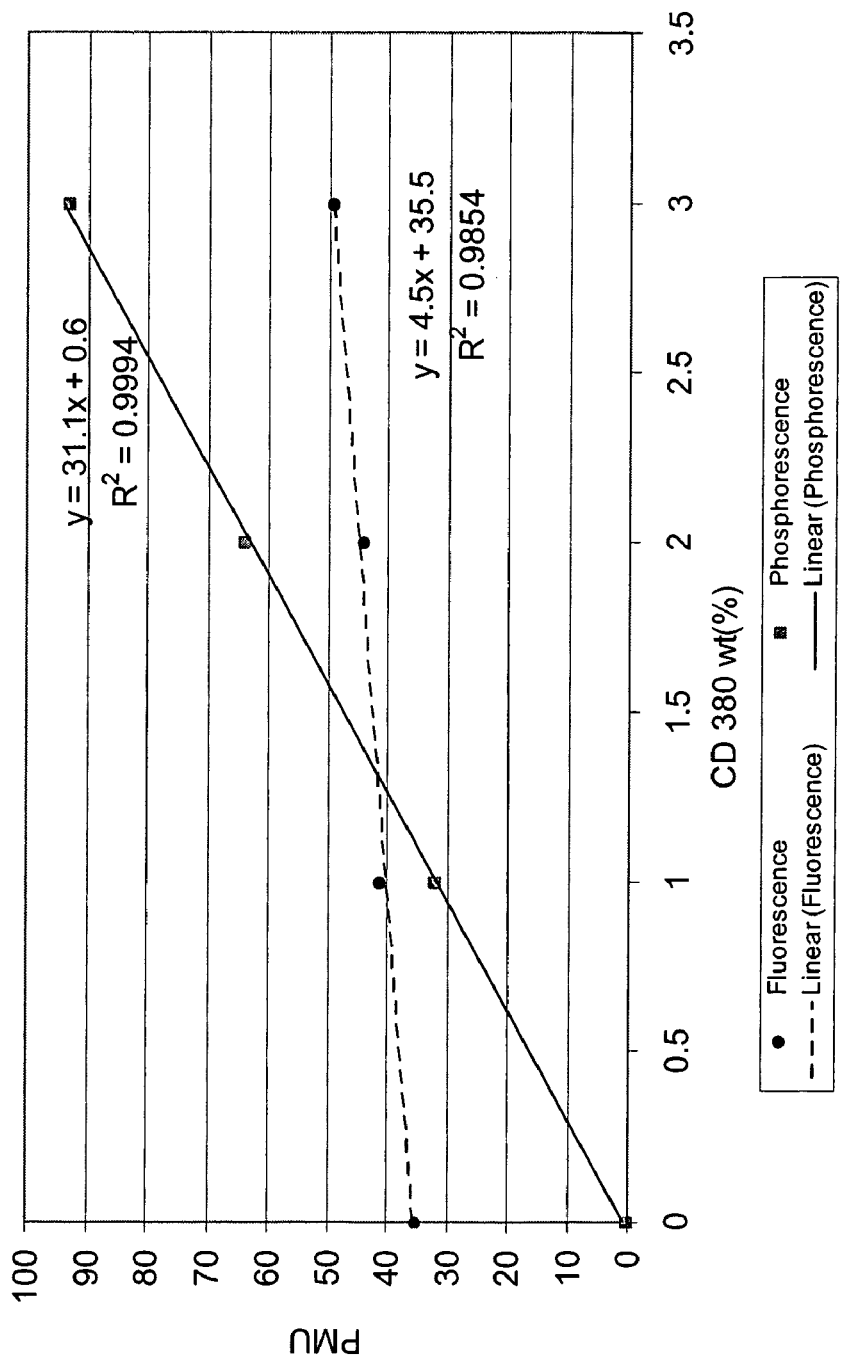
FIG. 3 is a graph showing variation of phosphorescence and fluorescence with rare earth composition concentration for inks of Example 2.

The fluorescence and phosphorescence of the inks were determined and the results are shown in the tables below and plotted in FIG. 3. The exact nature of the security ink is again shown to be very difficult to determine. One looking for fluorescence only with a conventional detector would not see a significant increase in fluorescence as compared to an ink without the rare earth specie and would not notice the phosphorescence. Providing inks differentiated according to the invention in this manner can enable the provision of a layer of security.

EXAMPLE 3

Another ink is prepared according to the invention, similar to that in Example 1 compared to a similar ink without the rare earth specie.

| Components | Wt (%) | Wt (%) |
|---|---|---|
| Distilled Water | 65.55 | 63.57 |
| Triethanolamine (TEA) | 0.30 | 0.29 |
| 4-methymopholine-N-Oxide (MMNO) | 1.87 | 1.81 |
| 5,5-Dimethyl hydantoin formaldehyde | 4.92 | 4.78 |
| Triethylene Glycol Mono Butyl Ether (BTG) | 2.54 | 2.46 |
| Dodecylbenzene sulphonic acid (DBSA) | 0.39 | 0.38 |
| Glycerol | 8.37 | 8.12 |
| 1,2,4-butanetriol | 3.89 | 3.78 |
| Acid Yellow 184 | 0.63 | 0.61 |
| Acid Red 52 (Pylam, 400%) | 0.78 | 0.76 |
| Pyranine 120 (Bayer) | 2.00 | 1.94 |
| Acryjet Cyan 157 (blue pigment dispersion) | 8.75 | 8.48 |
| Lumilux CD 380 | 0.00 | 3.02 |
| Distilled Water | 65.55 | 63.57 |
| Total | 100.0 | 100.0 |
| Properties of Drawdown and Inks | | |
| PMU, Fluorescence (drawdown) | 42 | 54 |
| PMU, Phosphorescence (drawdown) | 0 | 85 |
| OD (drawdown) | 0.83 | 0.80 |

-continued

| Components | Wt (%) | Wt (%) |
|---|---|---|
| pH | 7.54 | 7.33 |
| Viscosity (cp) | 2.40 | 2.61 |
| Surface Tension (Dyne/cm) | 35.2 | 34.1 |

Figure 4:
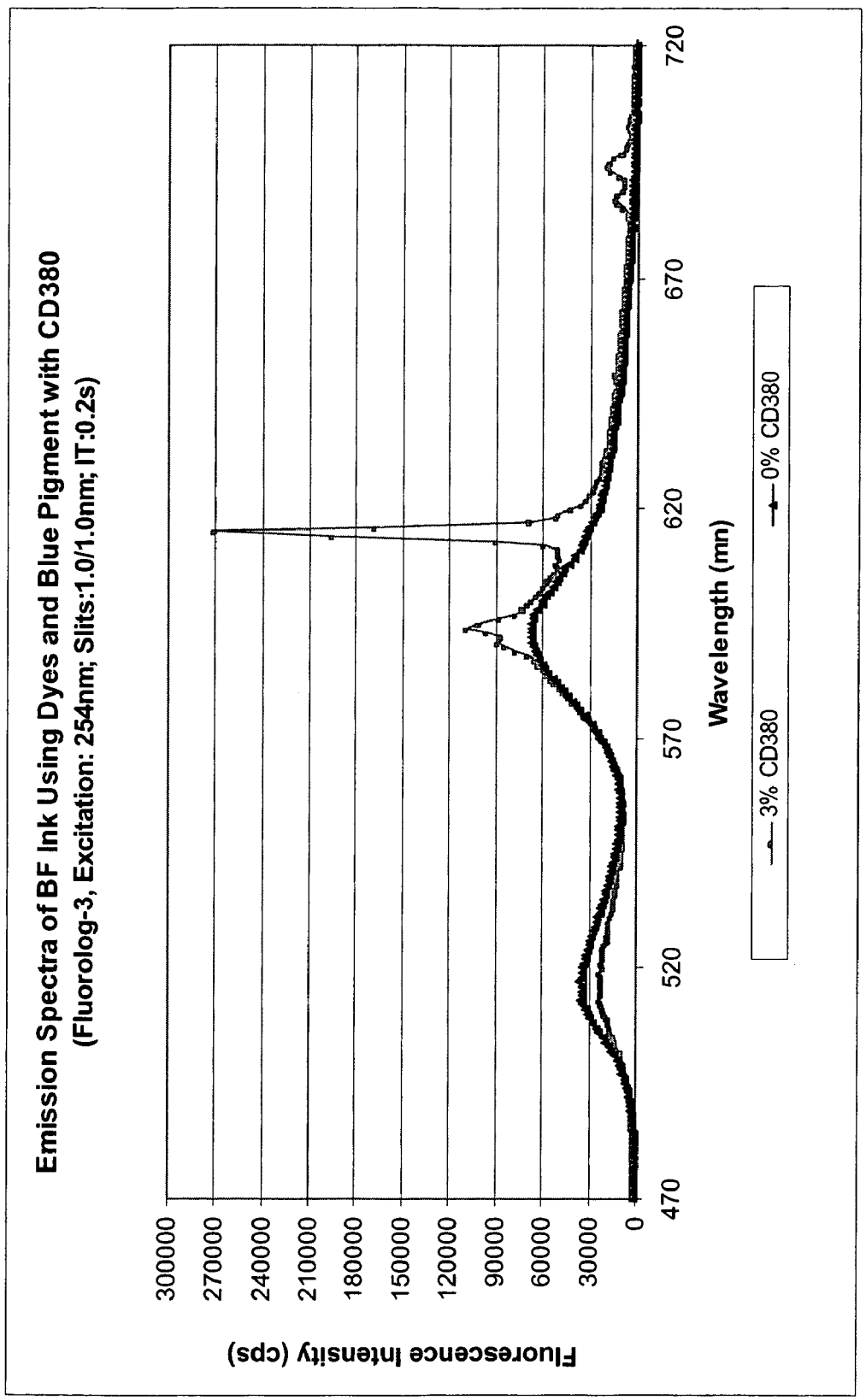
FIG. 4 is a graph showing fluorescence emission spectra of for an ink of the invention in accord with Example 3.

The two inks are compared, FIG. 4 showing emission spectra of fluorescence for the ink of the invention at varying concentrations of rare earth specie.

EXAMPLE 4

Another series of inks is prepared according to the invention, but employing a different rare earth metal composition.

| Components | Wt (%) | Wt (%) |
|---|---|---|
| Distilled Water | 72.09 | 63.44 |
| Triethanolamine (TEA) | 0.31 | 0.27 |
| 4-methymopholine-N-Oxide (MMNO) | 1.92 | 1.69 |
| 5,5-Dimethyl hydantoin formaldehyde | 5.06 | 4.45 |
| Triethylene Glycol Mono Butyl Ether (BTG) | 2.61 | 2.30 |
| Dodecylbenzene sulphonic acid (DBSA) | 0.40 | 0.35 |
| Glycerol | 8.6 | 7.57 |
| 1,2,4-butanetriol | 4.0 | 3.52 |
| Acid Yellow 184 | 0.65 | 0.57 |
| Acid Red 52 (Pylam, 400%) | 0.80 | 0.70 |
| Pyranine 120 (Bayer) | 2.06 | 1.81 |
| Millijet Blue 28 | 1.46 | 1.28 |
| Lumilux CD-E9574 | 0.00 | 12.00 |
| Total | 100.00 | 100.00 |

Figure 5:
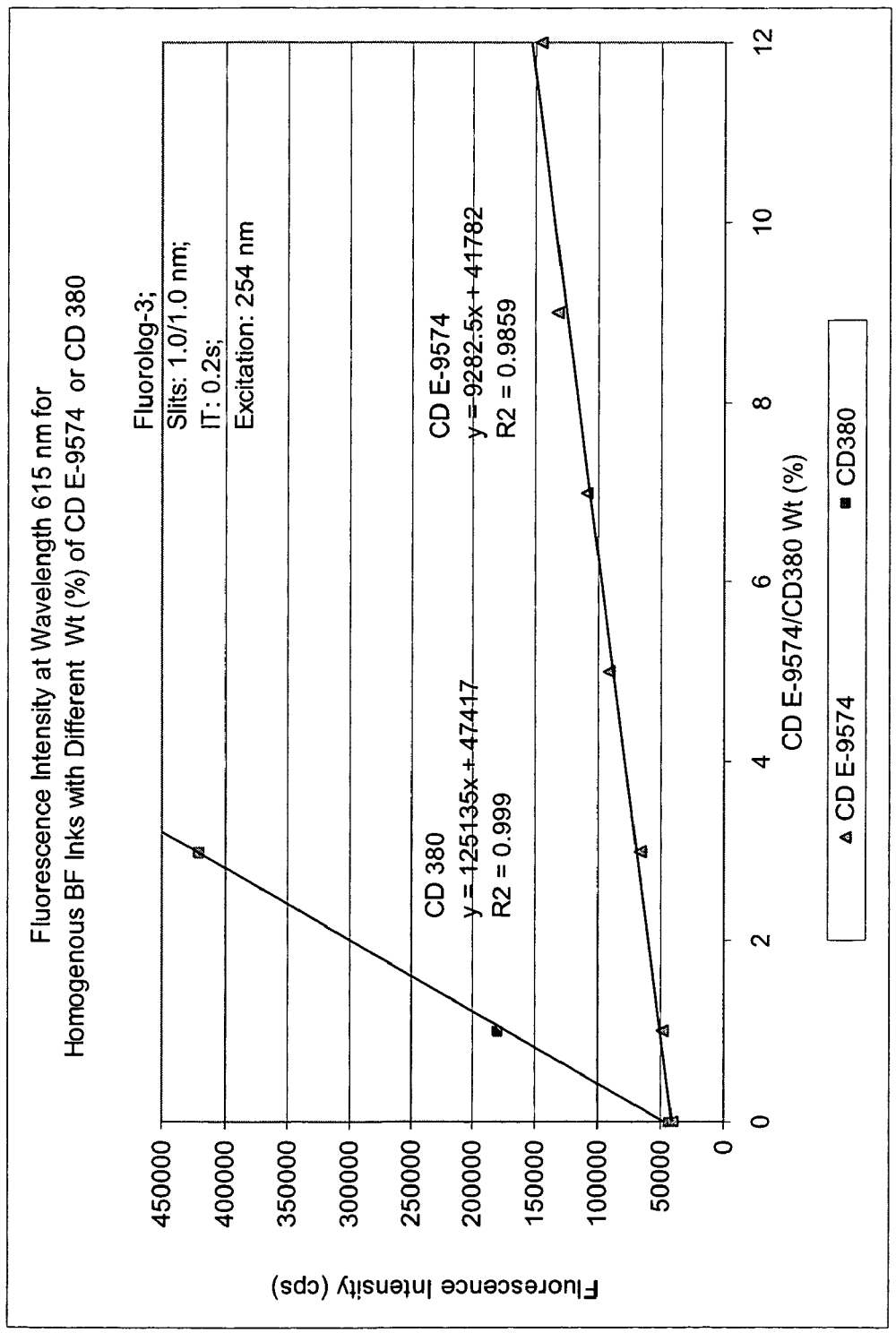
FIG. 5 is a graph showing a comparison of fluorescence intensity between two inks of the invention with different rare earth species, as illustrated in Example 4.
Figure 6:
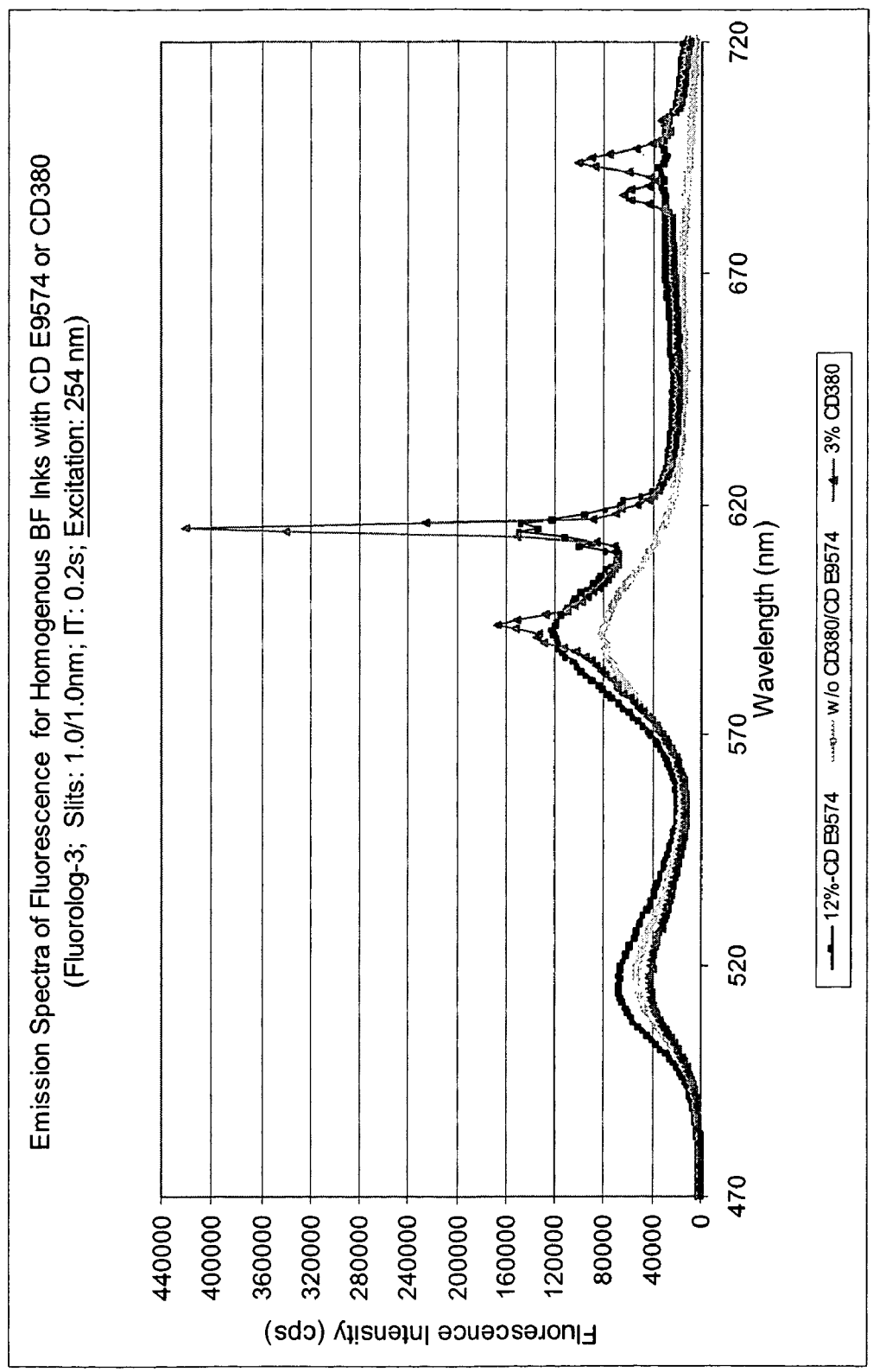
FIG. 6 shows emission spectra of fluorescence for homogenous for inks of Example 4.

These inks are compared with those of Example 1. In one comparison, the intensity of fluorescence (excitation @254 nm) for each was determined. It was revealed that the ink with 14% CD E9574 has the same intensity of fluorescence at wavelength of 615 nm as that the ink with 1% CD 380. Fluorescent intensities for the inks at wavelength 615 nm are shown in FIG. 5. Emission spectra of fluorescence for excitation at 254 nm are shown in FIG. 6.

| PROPERTIES OF HOMOGENEOUS TAGGED BLACK FLUORESCENT INKS WITH RARE EARTH TAGGANT COMPOSITIONS | | | |
|---|---|---|---|
| HOMOGENOUS BF INKS WITH | INITIAL INK | 12% CD E-9574 | 3% CD 380 |
| PMU (fluorescence) | 35 | 49 | 49 |
| OD (drawdown) | 0.83 | 0.81 | 0.80 |
| Intensity of fluorescence @ 615 nm (cps) | 41970 | 145940 | 420480 |
| Intensity of fluorescence @ 594 nm (cps) | 79315 | 119335 | 167255 |

Figure 7:
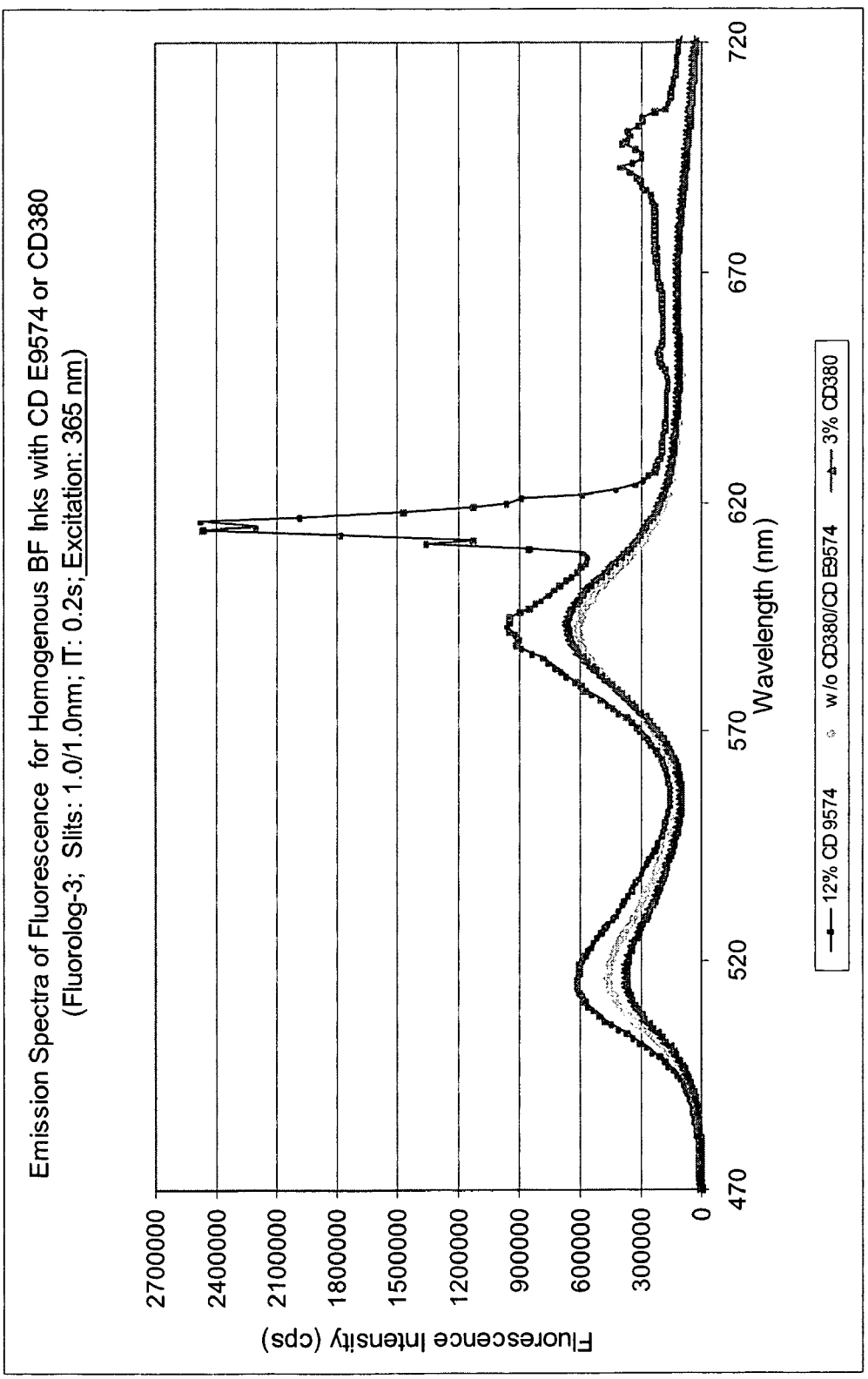
FIG. 7 shows emission spectra of fluorescence for inks of Example 4.
Figure 8:
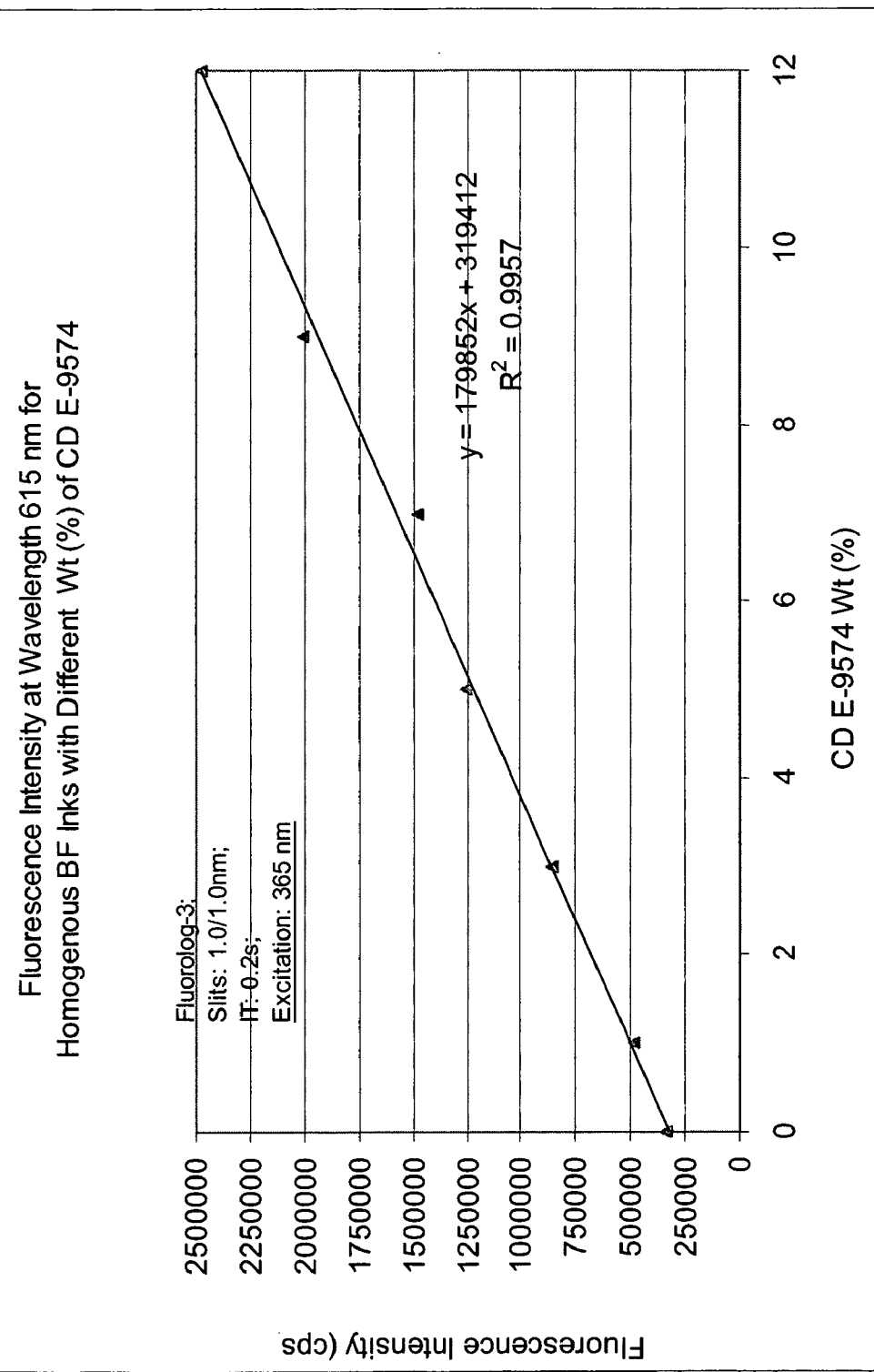
FIG. 8 shows fluorescence intensity at wavelength 615 nm for inks of Example 4.

Intensity of fluorescence (excitation @365 nm) was measured for the inks. The emission spectra (FIG. 7) show that the ink with CD E-9574 has an additional strong peak at 594 nm as well as one at wavelength of 615 nm compared to the ink with CD 380. Intensity of fluorescence at 594 nm is 667040 cps and 947415 cps for inks with 3% CD 380 and 12% CD E-9574, respectively. Intensity of fluorescence at 615 nm for inks with different wt (%) of CD E9574 is shown in FIG. 8.

Figure 9:
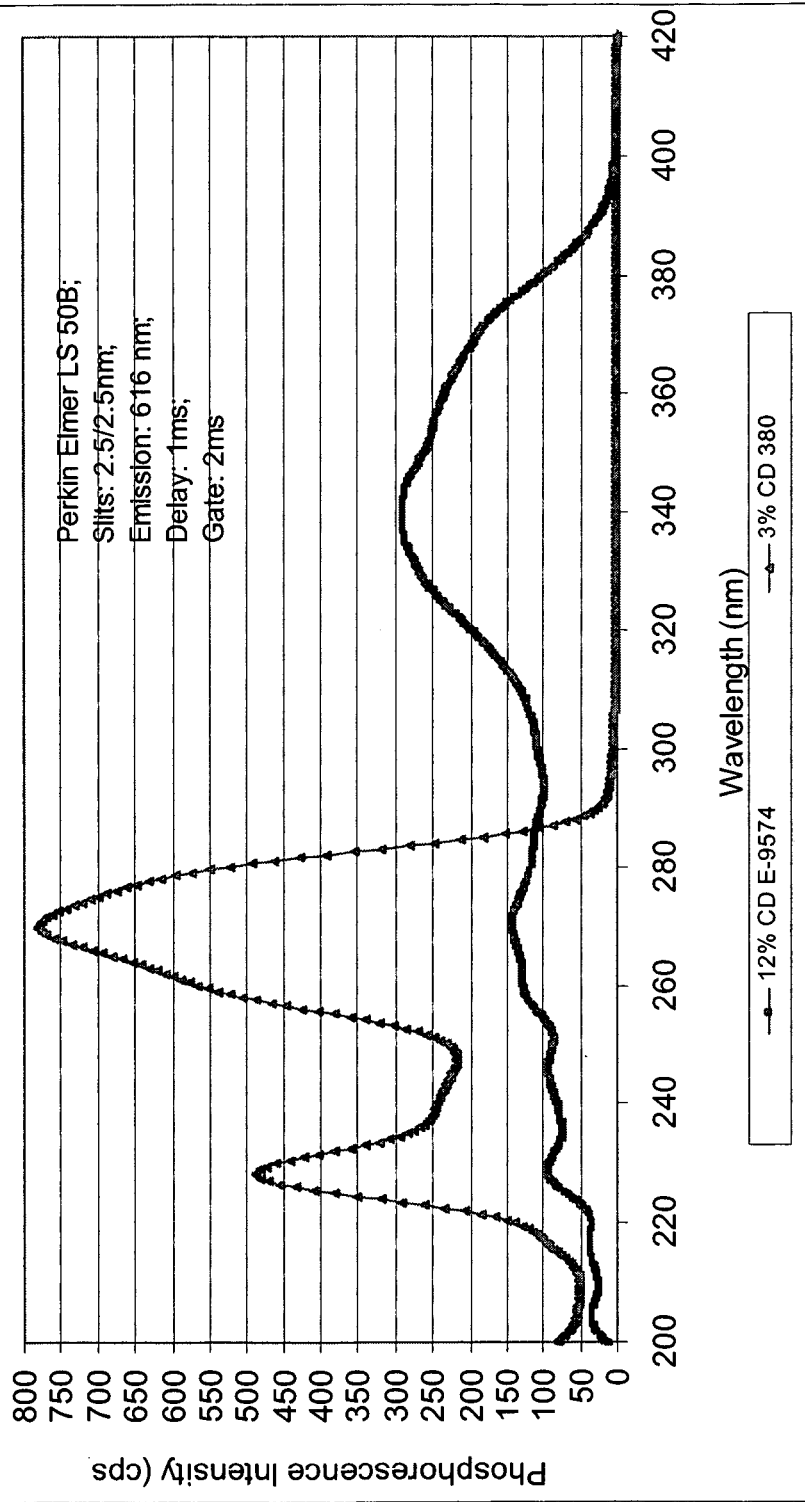
FIG. 9 shows comparison of excitation spectra of phosphorescence between inks of Example 4.

Excitation Spectra of Phosphorescence was measured for the inks. FIG. 9 shows two broad peaks at 270 nm and 340 nm for ink with CD E-9571. Two peaks appears at 230 nm and at 270 nm for ink with CD 380.

Figure 10:
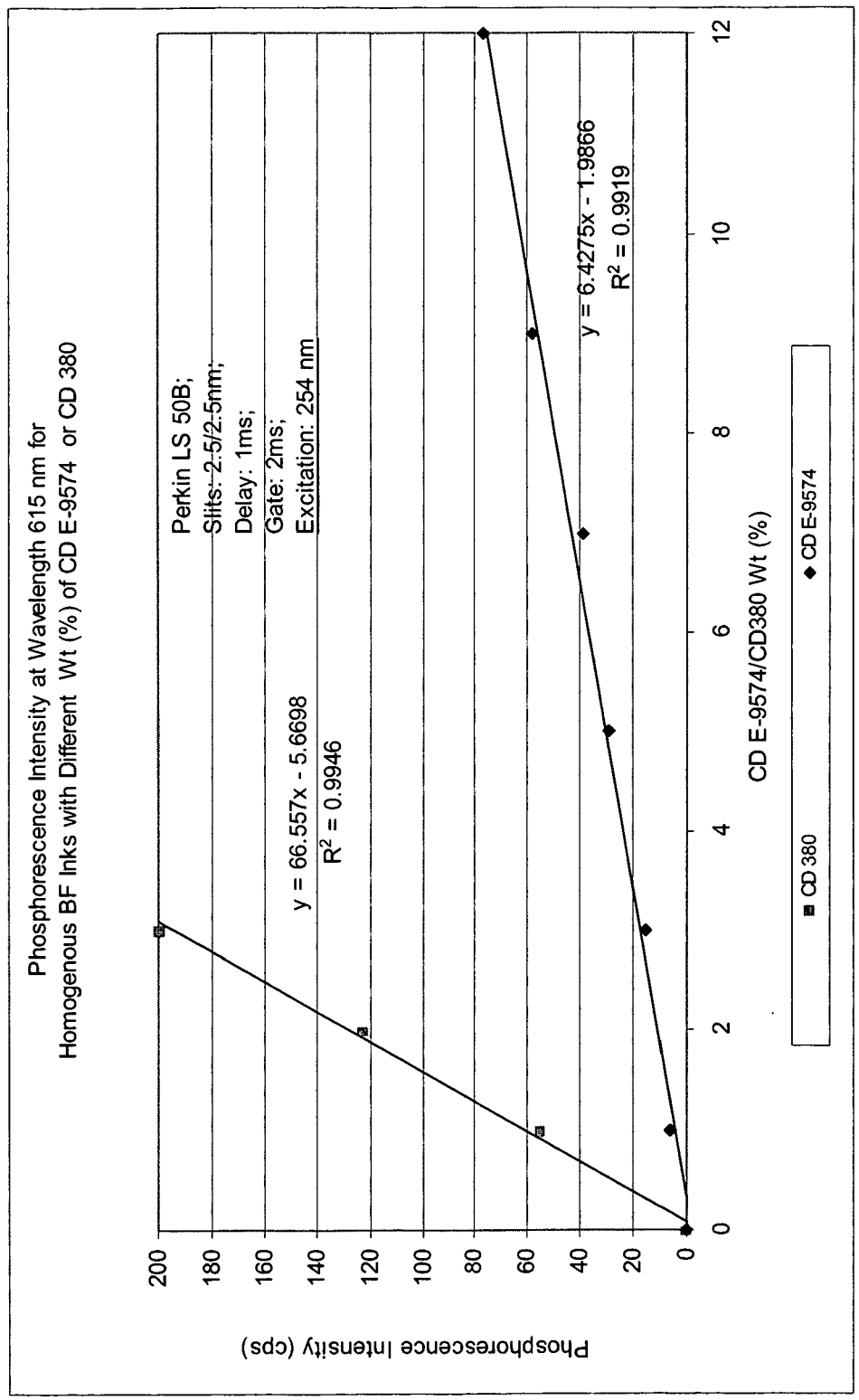
FIG. 10 shows phosphorescence Intensity at Wavelength 615 nm for inks of Example 4.
Figure 11:
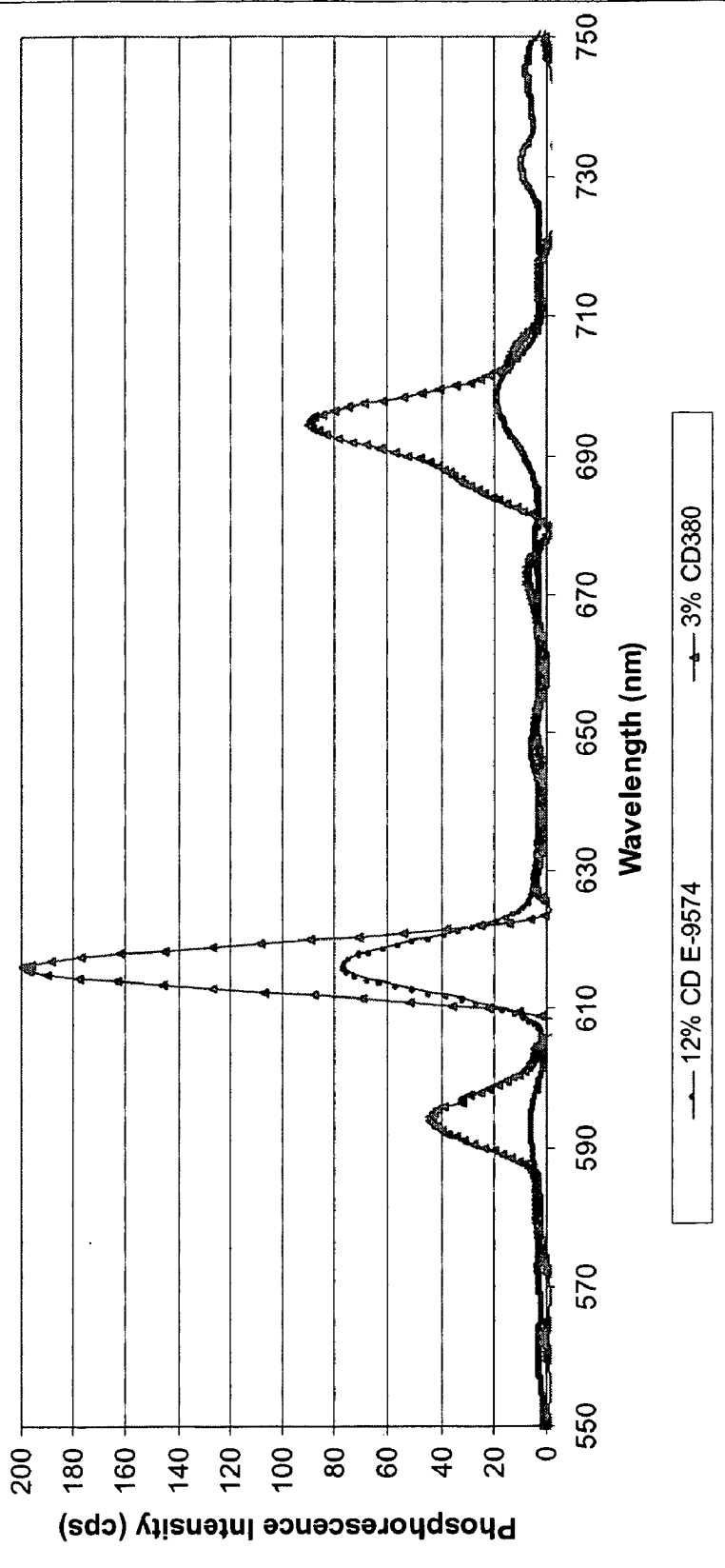
FIG. 11 shows comparison of emission spectra of phosphorescence between inks of Example 4.

Intensity of phosphorescence (excitation @254 nm) is measured. The ink with 10% CD E9574 has the same intensity of phosphorescence at wavelength of 615 nm as the other ink with 1% CD 380. See FIG. 10 and FIG. 11.

| HOMOGENOUS BF INK WITH | 12% CD E-9574 | 3% CD 380 |
|---|---|---|
| PMU (Phosphorescence) | 69 | 93 |
| Intensity Phosphorescence @ 616 nm (cps) | 77 | 199 |

Figure 12:
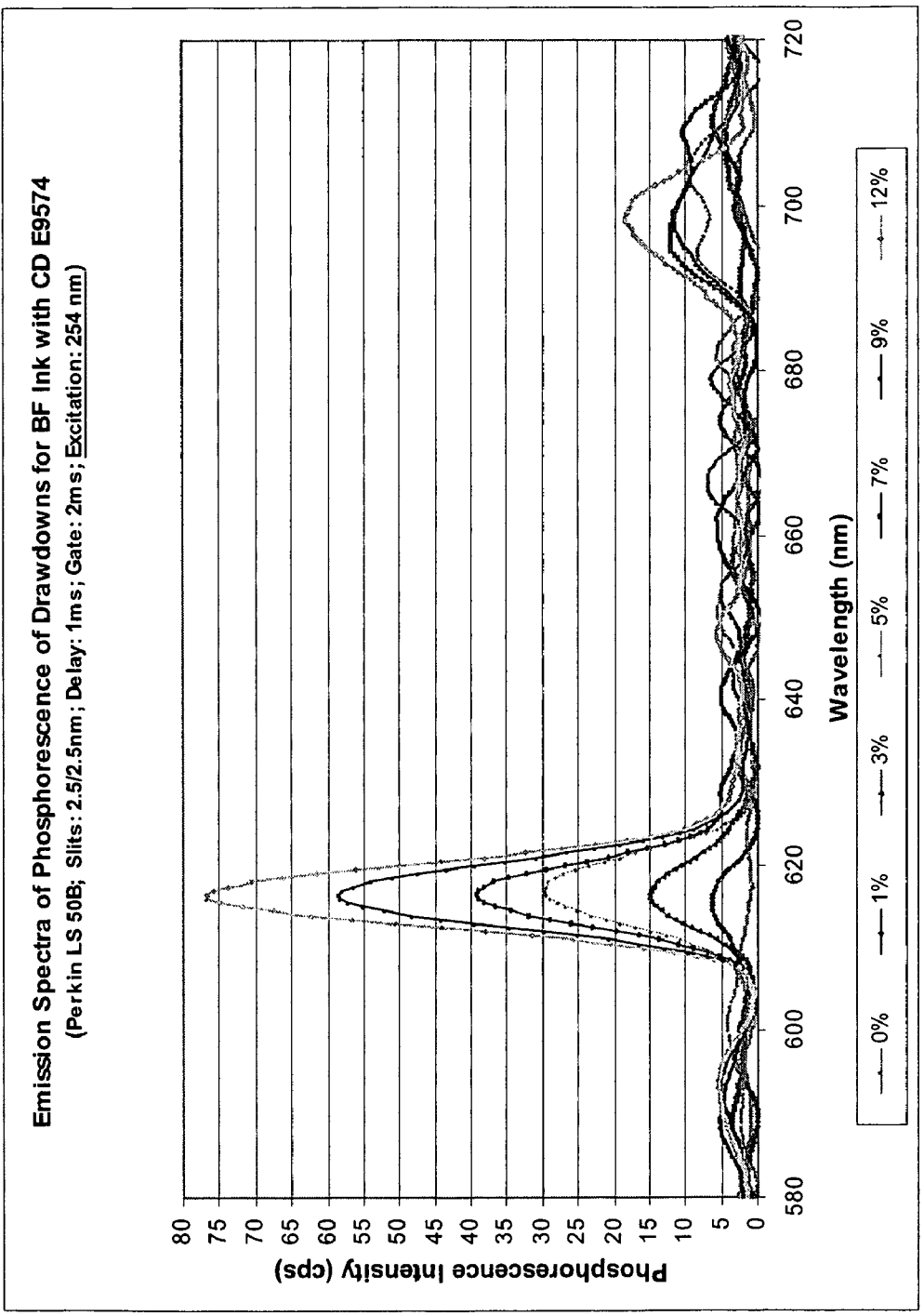
FIG. 12 shows emission spectra of phosphorescence of drawdowns for inks of Example 4.
Figure 13:
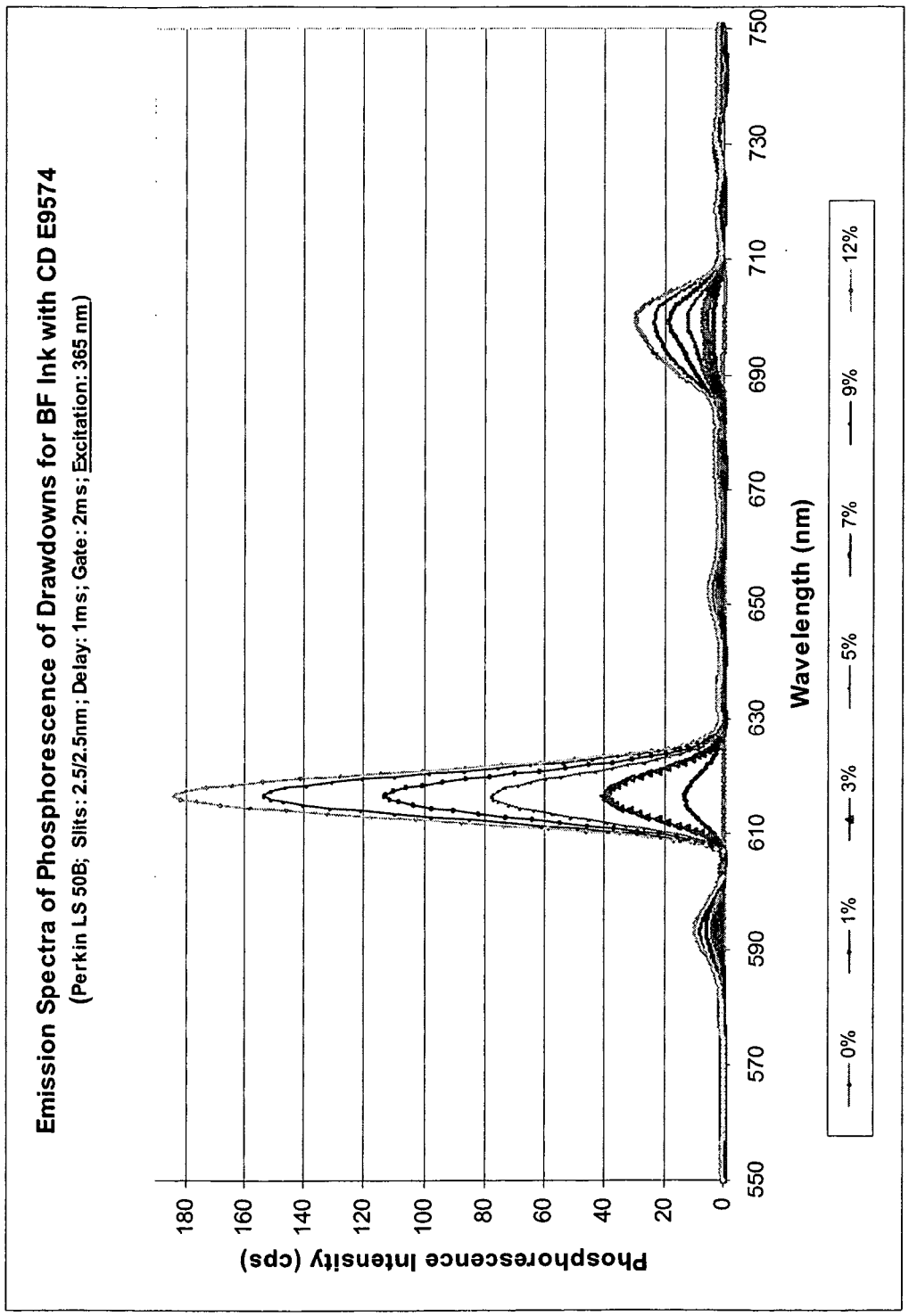
FIG. 13 shows emission spectra of phosphorescence of drawdowns for inks of Example 4.

The intensity of phosphorescence for inks with difference percentage of CD E9574 was measured and summarized graphically in FIG. 12 and FIG. 13.

Figure 14:
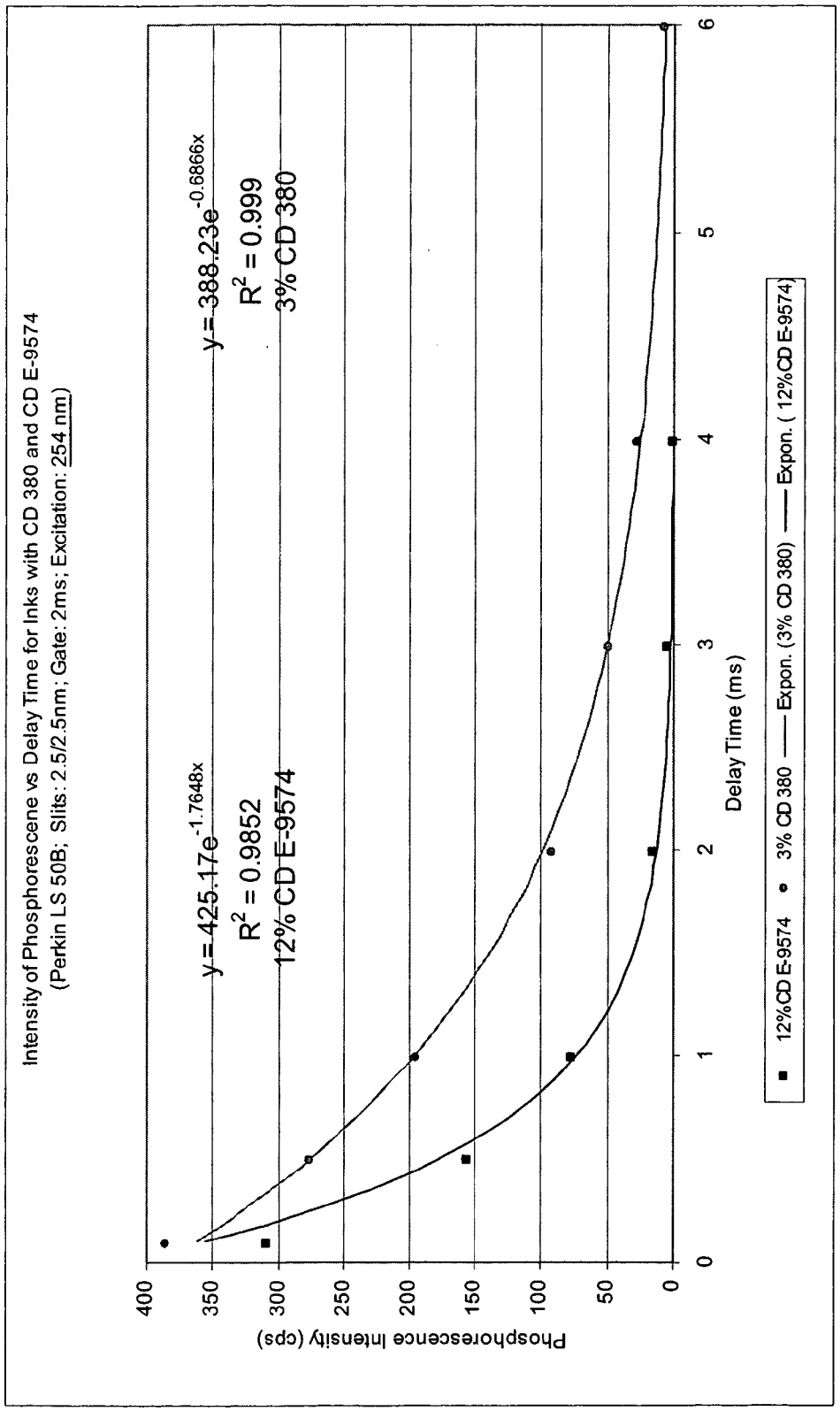
FIG. 14 shows intensity of phosphorescence vs. delay time for inks of Example 4.

The intensity of phosphorescence decay time of phosphorescence was measured and summarized graphically in FIG. 14.

| Intensity of Phosphorescence at Different Wavelength | | |
|---|---|---|
| Wavelength (nm) | 12% CD E-9574 | 3% CD 380 |
| 254 | 94 | 781 |
| 270 | 141 | 339 |
| 340 | 289 | 0 |
| 365 | 213 | 0 |

EXAMPLE 5

Figure 15:
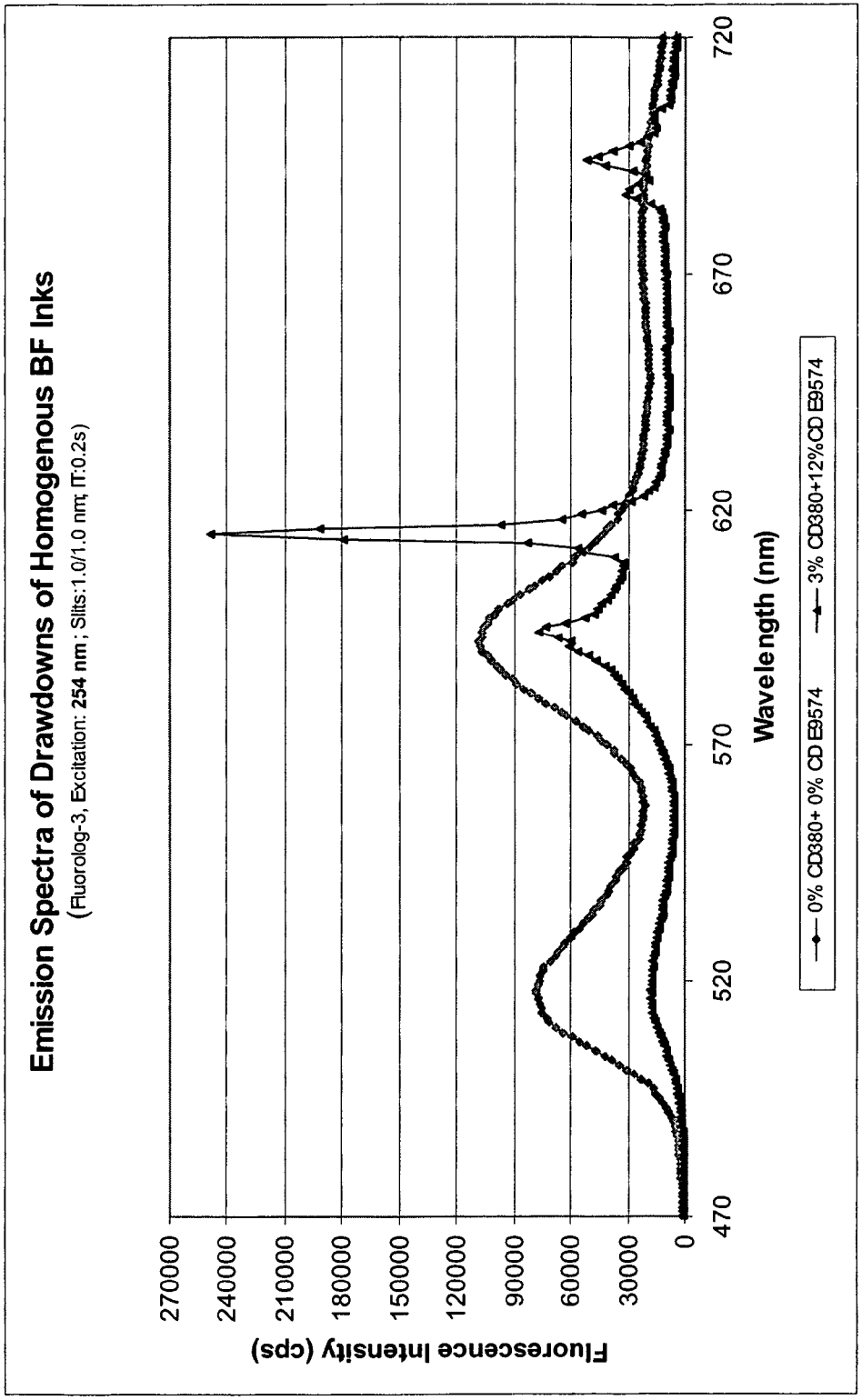
FIG. 15 shows spectra for fluorescence for excitation at 254 nm, compared to control.
Figure 16:
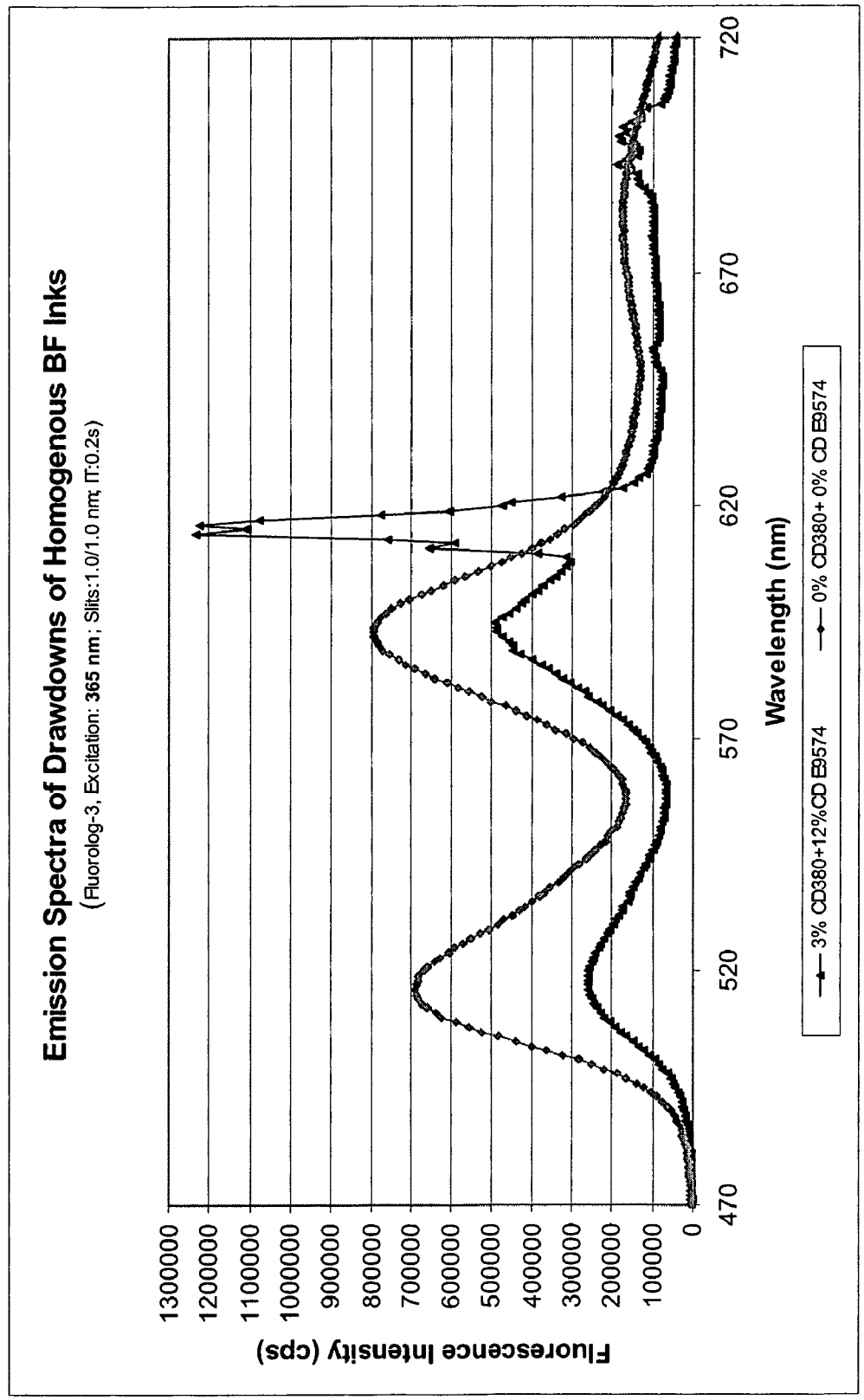
FIG. 16 shows spectra for fluorescence for excitation at 365 nm, compared to control.
Figure 17:
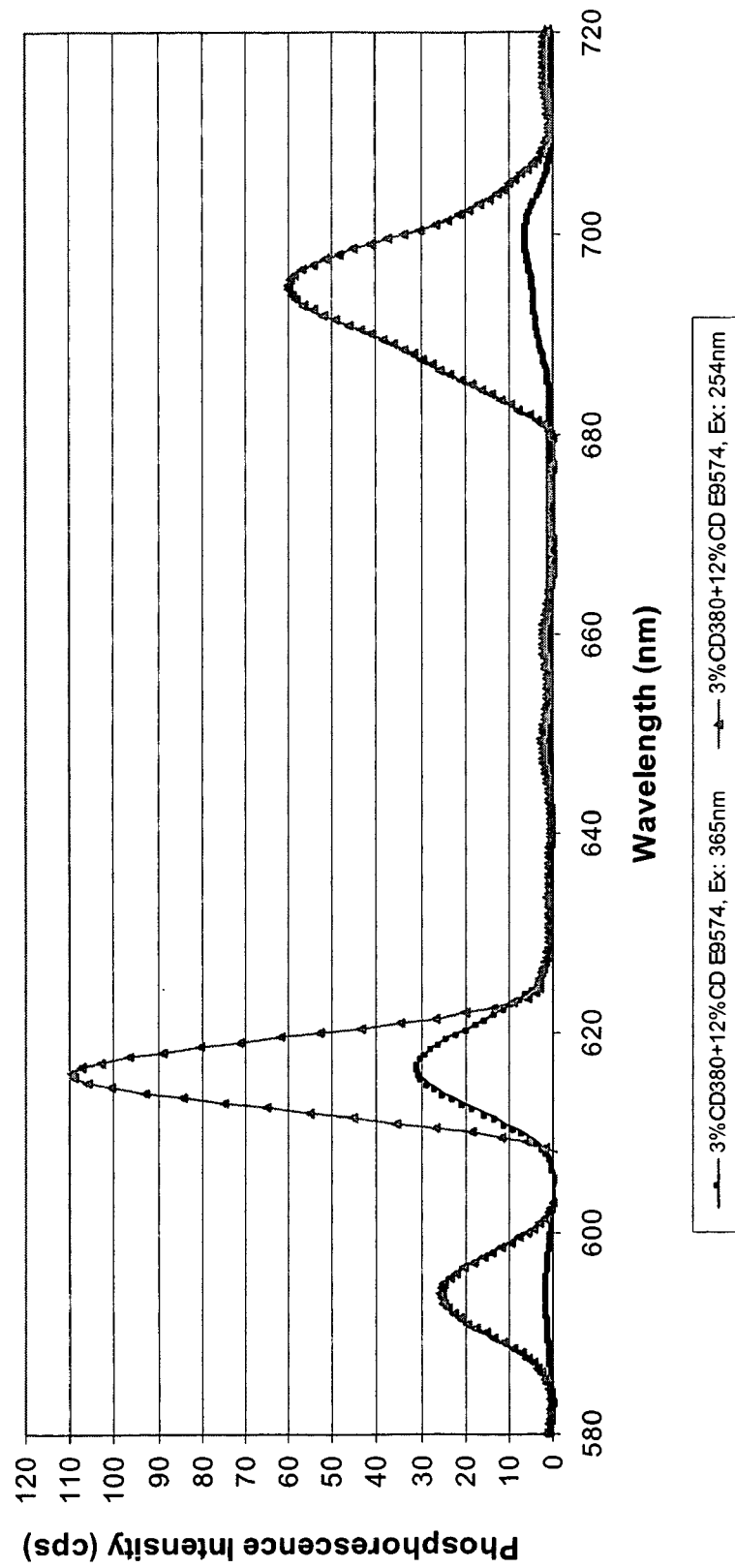
FIG. 17 shows spectra for phosphorescence for ink with both CD 380 and CD E9574 for excitation at 254 nm, or at 365 nm, respectively.

This example presents and ink with a unique combination of the two rare earth specie compositions of this example shows a remarkable resistance to identification and copying. Formulae for control, and ink with both CD 380 and CD E9574 are shown in the following table. Spectra for fluorescence for excitation at 254 nm, compared to control FIG. 15. Spectra for fluorescence for excitation at 365 nm, compared to control FIG. 16. Spectra for phosphorescence for ink with both CD 380 and CD E9574 for excitation at 254 nm, or at 365 nm, respectively FIG. 17.

| Formulations of Homogenous BF Inks (Control, and with 3% CD 380 and 12% CD E 9574) | | |
|---|---|---|
| Components | Wt (%) | Wt (%) |
| Distilled Water | 72.09 | 61.46 |
| Triethanolamine (TEA) | 0.31 | 0.34 |
| 4-methymopholine-N-Oxide (MMNO) | 1.92 | 1.69 |
| 5,5-Dimethyl hydantoin formaldehyde | 5.06 | 4.27 |
| Triethylene Glycol Mono Butyl Ether (BTG) | 2.61 | 2.21 |
| Dodecylbenzene sulphonic acid (DBSA) | 0.40 | 0.34 |
| Glycerol | 8.6 | 7.41 |
| 1,2,4-butanetriol | 4.0 | 3.07 |
| Acid Yellow 184 | 0.65 | 0.55 |
| Acid Red 52 (Pylam, 400%) | 0.80 | 0.68 |
| Pyranine 120 (Bayer) | 2.06 | 1.75 |
| Millijet Blue 28 | 1.46 | 1.24 |
| Lumilux CD380 | — | 3.0 |
| Lumilux CD-E9574 | — | 12.0 |
| Total | 100.0 | 100 |

-continued

| Formulations of Homogenous BF Inks (Control, and with 3% CD 380 and 12% CD E 9574) | | |
|---|---|---|
| Components | Wt (%) | Wt (%) |
| Properties of Drawdown and Inks | | |
| PMU, Fluorescence (drawdown) | 35 | 62 |
| PMU, Phosphorescence (drawdown) | 0 | 155 |
| OD (drawdown) | 0.83 | 0.78 |
| pH | 7.62 | 7.42 |
| Viscosity (cp) | 2.42 | 7.96 |
| Surface Tension (Dyne/cm) | 35.1 | 36.5 |

EXAMPLE 6

An ink according to the invention is prepared including as an additional security component in the form of a composition exhibiting two fluorescent bands (one, a broad emission band characteristic of fluorescent colorants in black fluorescent ink and a second distinct, narrow fluorescent emission band due to the presence of a rare earth metal composition, Europium in Lumilux CD380) and phosphorescence due to the rare earth metal composition. This ink is compared to a black fluorescent ink not containing the additional security component.

| Components | Wt (%) Comparison | Wt (%) Invention |
|---|---|---|
| Distilled Water | 65.55 | 63.57 |
| Triethanolamine (TEA) | 0.30 | 0.29 |
| 4-methymopholine-N-Oxide (MMNO) | 1.87 | 1.81 |
| 5,5-Dimethyl hydantoin formaldehyde | 4.92 | 4.78 |
| Triethylene Glycol Mono Butyl Ether (BTG) | 2.54 | 2.46 |
| Dodecylbenzene sulphonic acid (DBSA) | 0.39 | 0.38 |
| Glycerol | 8.37 | 8.12 |
| 1,2,4-butanetriol | 3.89 | 3.78 |
| Acid Yellow 184 | 0.63 | 0.61 |
| Acid Red 52 (Pylam, 400%) | 0.78 | 0.76 |
| Pyranine 120 (Bayer) | 2.00 | 1.94 |
| Acryjet Cyan 157 (blue pigment dispersion) | 8.75 | 8.48 |
| Lumilux CD 380 | 0.00 | 3.02 |
| Total | 100.0 | 100.0 |
| Properties of Drawdown and Inks | | |
| PMU, Fluorescence (drawdown) | 42 | 54 |
| PMU, Phosphorescence (drawdown) | 0 | 85 |
| OD (drawdown) | 0.83 | 0.80 |
| pH | 7.54 | 7.33 |
| Viscosity (cp) | 2.40 | 2.61 |
| Surface Tension (Dyne/cm) | 35.2 | 34.1 |

The effect of adding the rare earth metal composition to the black fluorescent ink provides a striking security effect here is similar to that of Example 1.

EXAMPLE 7

In this example, another ink is prepred according to the invention, but containing carbon black, and it is compared to a like ink having carbon black but no rare earth composition. The inks are prepared from the following materials:

| Components | Wt (%) | Wt (%) |
|---|---|---|
| Distilled Water | 70.57 | 68.45 |
| Triethanolamine (TEA) | 0.29 | 0.28 |
| 4-methymopholine-N-Oxide (MMNO) | 1.78 | 1.73 |
| 5,5-Dimethyl hydantoin formaldehyde | 4.69 | 4.55 |
| Triethylene Glycol Mono Butyl Ether (BTG) | 2.42 | 2.35 |
| Dodecylbenzene sulphonic acid (DBSA) | 0.38 | 0.36 |
| Glycerol | 9.4 | 9.1 |
| 1,2,4-butanetriol | 3.8 | 3.6 |
| Acid Yellow 184 | 0.60 | 0.58 |
| Acid Red 52 (Pylam, 400%) | 0.74 | 0.72 |
| Pyranine 120 (Bayer) | 1.91 | 1.86 |
| Millijet Blue 28 | 1.35 | 1.31 |
| Degussa Carbon Black 31K | 2.07 | 2.01 |
| Lumilux CD380 | — | 3.01 |
| Total | 100.0 | 100.0 |

The inks were tested to show the following:

| | | |
|---|---|---|
| PMU, Fluorescence (drawdown) | 33 | 46 |
| PMU, Phosphorescence (drawdown) | 0 | 90 |
| OD (drawdown) | 0.88 | 0.86 |
| pH | 7.61 | 7.41 |
| Viscosity (cp) | 2.45 | 2.70 |
| Surface Tension (Dyne/cm) | 35.7 | 34.8 |

The inks showed the Intensity of Fluorescence and Phosphorescence (Excitation at 254 nm) indicated in the following table for inks of similar formulation with the concentration of the rare earth composition (CD380) varied.

EFFECT OF LUMILUX CD380 ON FLUORESCENCE AND PHOSPHORESCENCE FOR BF INK USING DYES AND CARBON BLACK

| CD380 wt (%) | Fluorescence* Intensity at different wavelength (excitation: 254 nm) | | Phosphorescence** Excitation: 254 nm | | |
|---|---|---|---|---|---|
| | 594 nm | 615 nm | 594 nm | 616 nm | 695 nm |
| 0 | 79300 | 31800 | 0 | 0 | 0 |
| 1 | 103200 | 136100 | 6 | 28 | 5 |
| 2 | 117000 | 231300 | 11 | 61 | 12 |
| 3 | 136100 | 341100 | 19 | 91 | 24 |

Notes:
*Intensity was measured by Fluorolog-3.
**Intensity was measured by Perkin LS 50B.

EFFECT OF LUMILUX CD380 ON FLUORESCENCE FOR BF INK USING DYES AND CARBON BLACK

| CD380 wt (%) | Intensity at different wavelength (excitation: 365 nm) | |
|---|---|---|
| | 517 nm | 594 nm |
| INTENSITY OF FLUORESCENCE (EXCITATION AT 365 NM) | | |
| 0 | 463100 | 602300 |
| 1 | 417000 | 678400 |
| 2 | 363400 | 679400 |
| 3 | 381400 | 667000 |

-continued

EFFECT OF LUMILUX CD380 ON FLUORESCENCE
FOR BF INK USING DYES AND CARBON BLACK

| CD380 wt (%) | Intensity at different wavelength (excitation: 365 nm) | |
| --- | --- | --- |
|  | 517 nm | 594 nm |
| PMU FOR FLUORESCENCE AND PHOSPHORESCENCE | | |
| 0 | 463100 | 602300 |
| 1 | 417000 | 678400 |
| 2 | 363400 | 679400 |
| 3 | 381400 | 667000 |

*Intensity was measured by Fluorolog-3.

Figure 19:
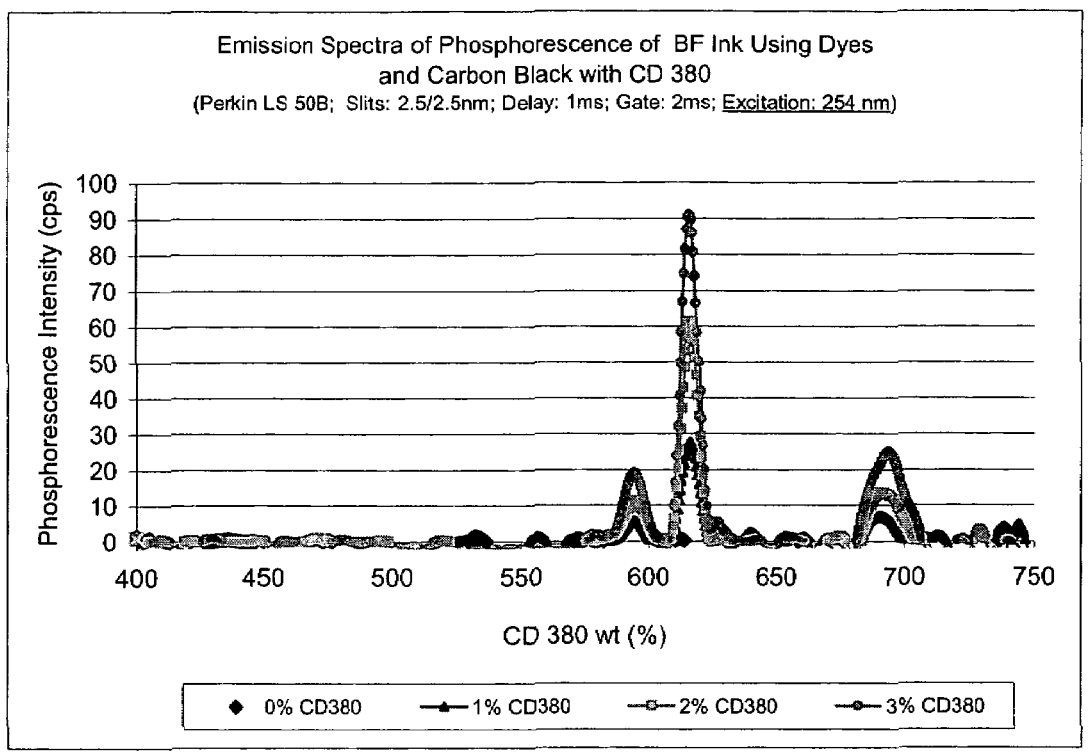
FIG. 19 is a graph showing the phosphorescence emission spectra of the inks of Example 7 with varying concentrations of rare earth composition.
Figure 20:
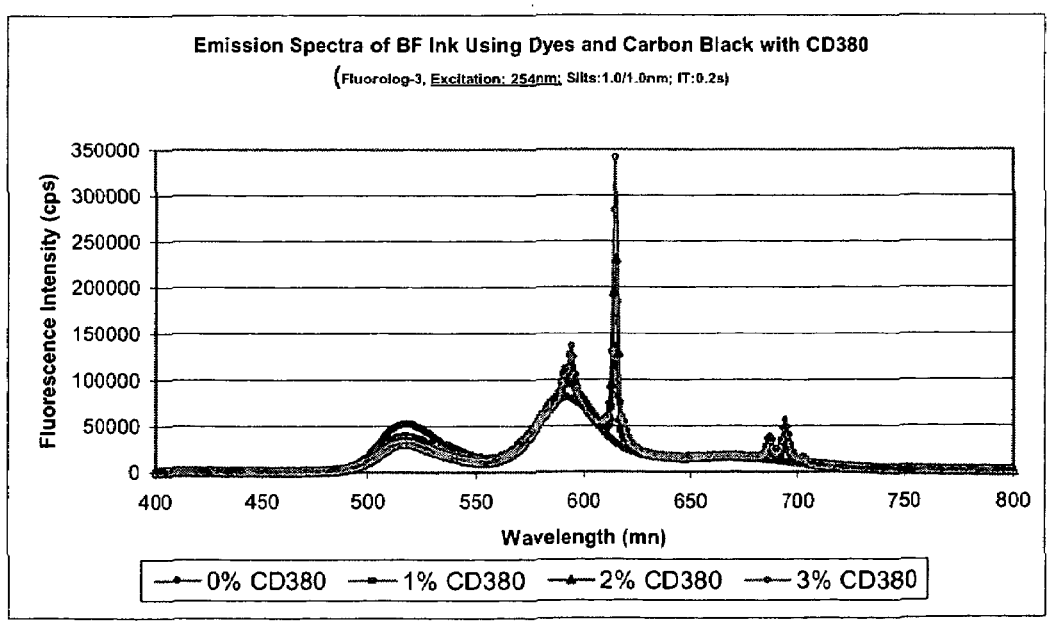
FIG. 20 is a graph showing the fluorescence emission spectra of the inks of Example 7 with varying concentrations of rare earth composition.
Figure 21:
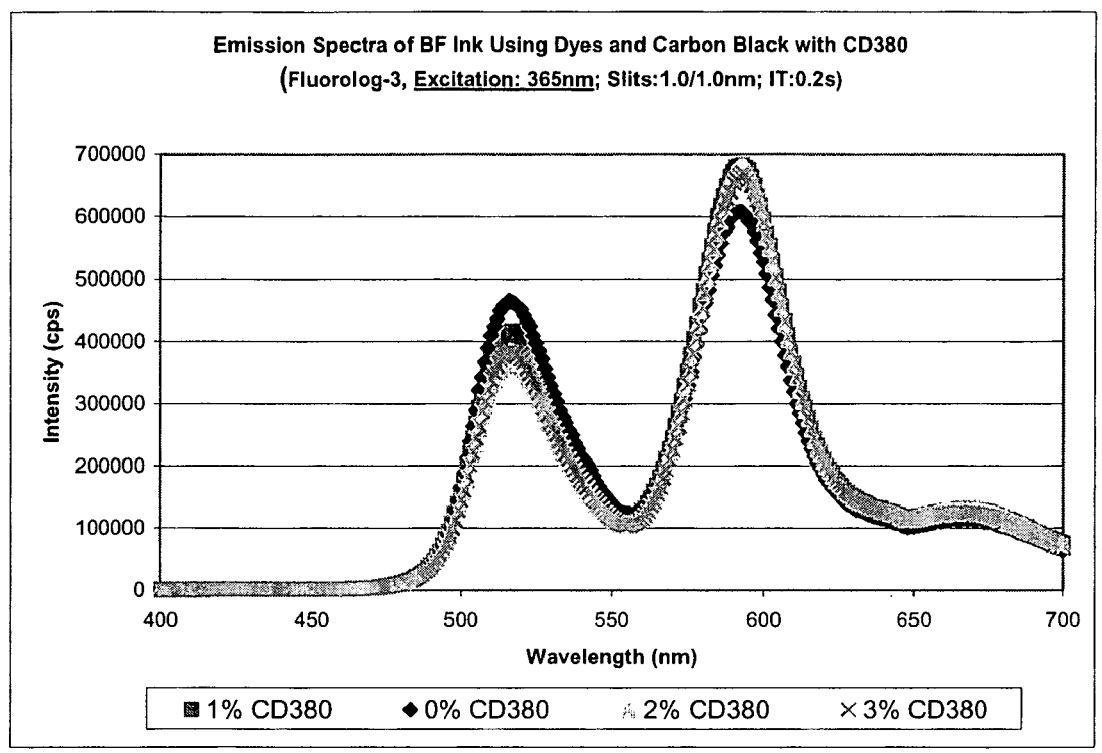
FIG. 21 is a graph showing the intensity of fluorescence emission of the inks of Example 7 with varying concentrations of rare earth composition.

For the above inks, FIG. 19 is a graph showing the phosphorescence emission spectra of and FIG. 20 is a graph showing the fluorescence emission spectra. FIG. 21 is a graph showing the intensity of emission for these inks.

EXAMPLE 8

A series of inks according to the invention is prepared and evaluated. The table below shows luminescence intensity versus weight percent of rare earth composition.

| % CDE9574 | PMU (Red Fluorescence) | PMU (Red Phosphorescence) |
| --- | --- | --- |
| 0% | 44 | 2 |
| 4.19% | 49 | 13 |
| 8.02% | 53 | 25 |
| 11.88% | 55 | 36 |
| 15.89% | 58 | 47 |
| 20.25% | 65 | 81 |

Figure 22:
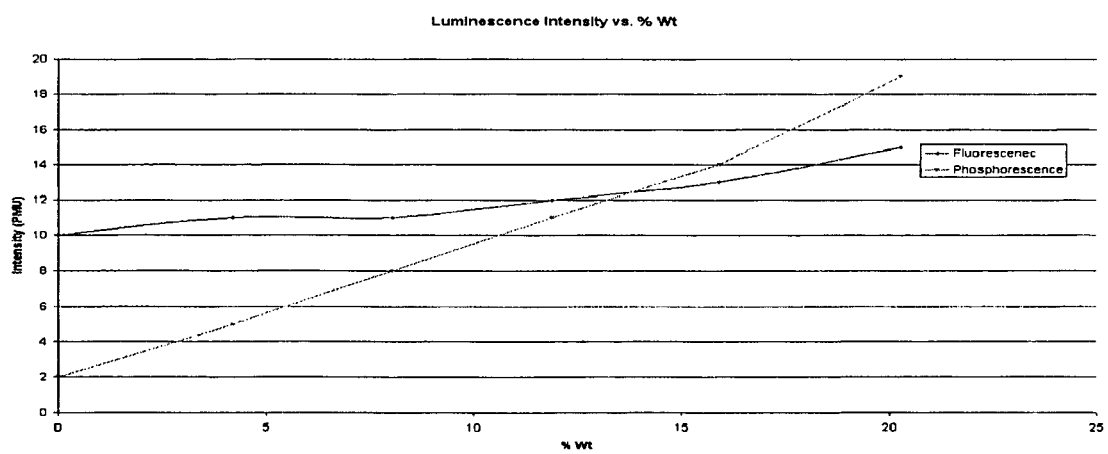
FIG. 22 is a graph showing luminescence intensity versus weight percent of rare earth composition.
Figure 23:
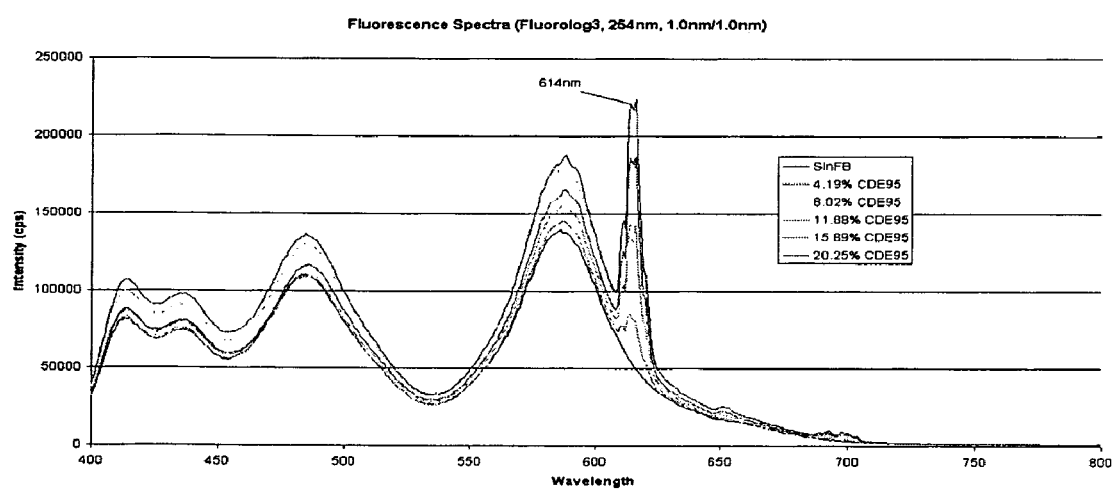
FIG. 23 is a graph showing fluorescence intensity versus weight percent of rare earth composition.

FIG. 22 is a graph showing luminescence intensity versus weight percent of rare earth composition. FIG. 23 is a graph showing fluorescence intensity versus weight percent of rare earth composition.

The above description is intended to enable the person skilled in the art to practice the invention. It is not intended to detail all of the possible modifications and variations, which will become apparent to the skilled worker upon reading the description. It is intended, however, that all such modifications and variations be included within the scope of the invention which is seen in the above description and otherwise defined by the following claims. The claims are meant to cover the indicated elements and steps in any arrangement or sequence which is effective to meet the objectives intended for the invention, unless the context specifically indicates the contrary.

What is claimed is:

1. An aqueous ink capable of providing a secure marking including a dark, machine-readable image exhibiting fluorescence when exposed to fluorescent-exciting radiation, said ink being of suitable viscosity and surface tension for use in ink jet printing, comprising:
   (a) a first colorant comprising a fluorescent dye and/or pigment emitting light within a characteristic emission band when excited by fluorescent-exciting radiation;
   (b) a second colorant comprising a dye and/or colloidal pigment having a light absorption band overlapping with or at longer wavelengths than the characteristic emission band of the first colorant, in such a way as to result in a dark color,
   (c) a third component comprising a phosphorescent rare earth composition in an amount greater than zero, and
   (d) an aqueous liquid vehicle comprising water and a water-soluble vehicle in sufficient amounts to achieve an ink viscosity and surface tension effective for application of the ink to a substrate in a predetermined pattern by ink jet printing.

2. An ink according to claim 1 wherein the phosphorescent composition comprises a composition of Europium.

3. An ink according to claim 1 wherein the second colorant comprises a colloidal pigment.

4. An ink according to claim 1 wherein the colorants are selected such that an image when dry after a draw down on white envelope substrate exhibits a fluorescent intensity of 50 to 99+ PMU.

5. An ink according to claim 1 which exhibits a viscosity of less than 15 cps.

6. An ink according to claim 1 wherein the ink comprises two rare earth species having characteristic, different emission spectra.

7. An ink according to claim 1 wherein the ink exhibits an emission band width of from about 70 to 80 nm for a primary peak and a secondary peak of less than about 10 nm.

8. An ink according to claim 1 comprising a rare earth species showing a fluorescent spike on the right side of a primary fluorescence peak and a secondary emission peak.

9. An ink according to claim 1 comprising a rare earth composition showing detectable phosphorescence when present at a concentration of less than 5% of the weight of the ink.

10. A process for printing a security marking on a substrate, comprising:
    printing an image having visible, fluorescent and phosphorescent components by providing an inkjet printer with an ink as described in claim 1, and printing an image with the ink on a substrate.

11. A process according to claim 10, wherein the phosphorescent component comprises a composition of Europium.

12. A process according to claim 10, wherein the second colorant comprises a colloidal pigment.

13. A process according to claim 10, wherein the ink comprises comprising a rare earth species showing a phosphorescence spike on the right side of a primary fluorescence peak and a secondary emission peak.

14. A process according to claim 13, wherein the rare earth species shows a detectable phosphorescence when present at a concentration of less than 5% of the weight of the ink.

15. A security method, comprising:
    (a) printing an image on a substrate with an ink as described in claim 1;
    (b) illuminating the image with white light;
    (c) reading the image as illuminated with white light;
    (d) illuminating the image with ultraviolet light;
    (e) reading the image with a red fluorescence detector;
    (f) comparing the image read with the red fluorescence detector to a reference value;
    (g) generating a control signal based on the comparison of step (f);
    (h) terminating ultraviolet illumination;
    (i) reading the image with a red phosphorescence detector;
    (j) comparing the image read with the red phosphorescence detector to a reference value; and
    (k) generating a control signal based on the comparison of step (j).

16. A process according to claim 15, including the further step of correlating signals generated by the images read with reference values for trusted senders.

17. A process according to claim 15, including the further step of rapidly screening a plurality of mailpieces and using signals generated by the images read to activate means to separate mailpieces from trusted senders from mailpieces not identified as originating with trusted senders.

18. A process according to claim 15, wherein the substrate is a mailpiece and the image is read by a facer canceller.

19. A process according to claim 15, wherein the image is excited selectively and tested for fluorescence and phosphorescence.

20. A process according to claim 15, wherein the ink comprises two rare earth species having characteristic, different emission spectra.

* * * * *